US010393528B2

(12) United States Patent
Schubert et al.

(10) Patent No.: US 10,393,528 B2
(45) Date of Patent: Aug. 27, 2019

(54) SYSTEMS AND METHODS FOR NAVIGATION PATH DETERMINATION FOR UNMANNED VEHICLES

(71) Applicant: Wing Aviation LLC, Mountain View, CA (US)

(72) Inventors: Martin Schubert, Mountain View, CA (US); Philip Watson, Mountain View, CA (US); Michael Grundmann, Mountain View, CA (US); Gabriella Levine, Mountain View, CA (US)

(73) Assignee: WING AVIATION LLC, Mountain View, CA (US)

( * ) Notice: Subject to any disclaimer, the term of this patent is extended or adjusted under 35 U.S.C. 154(b) by 132 days.

(21) Appl. No.: 15/667,443

(22) Filed: Aug. 2, 2017

(65) Prior Publication Data
US 2019/0041219 A1    Feb. 7, 2019

(51) Int. Cl.
*B64C 39/00* (2006.01)
*G01C 21/00* (2006.01)
(Continued)

(52) U.S. Cl.
CPC .......... *G01C 21/165* (2013.01); *B64C 39/024* (2013.01); *G01C 21/005* (2013.01);
(Continued)

(58) Field of Classification Search
CPC ................... G01C 21/165; G06T 7/70; G06T 2207/10032; G06T 2207/30261;
(Continued)

(56) References Cited

U.S. PATENT DOCUMENTS 7,353,110 B2    4/2008  Kim
7,657,466 B2    2/2010  Klingenberg et al.
(Continued)

FOREIGN PATENT DOCUMENTS

WO    WO 2015/061008    4/2015

OTHER PUBLICATIONS

PCT International Search Report issued in International Application No. PCT/US2018/043449, dated Nov. 7, 2018, 12 pages.
(Continued)

*Primary Examiner* — Yonel Beaulieu
(74) *Attorney, Agent, or Firm* — Christensen O'Connor Johnson Kindness PLLC

(57) ABSTRACT

Examples implementations relate to navigation path determination. An example method includes receiving, at a computing system, video data showing a demonstration path for navigating a location. The method further includes identifying, using the video data, a set of permissible surfaces at the location, wherein each permissible surface was traversed by the demonstration path. The method additionally includes determining a navigation path for a vehicle to follow at the location, wherein the navigation path includes a variation from the demonstration path such that the variation causes the vehicle to stay within one or more permissible surfaces from the set of permissible surfaces. The method also includes causing, by the computing system, the vehicle to follow the navigation path to navigate the location.

20 Claims, 11 Drawing Sheets

(51) Int. Cl.

| | | |
|---|---|---|
| *G01S 19/47* | (2010.01) | |
| *G05D 1/00* | (2006.01) | |
| *G06K 9/00* | (2006.01) | |
| *G06Q 10/00* | (2012.01) | |
| *G01C 21/16* | (2006.01) | |
| *B64C 39/02* | (2006.01) | |
| *G06T 7/70* | (2017.01) | |
| *G06Q 10/08* | (2012.01) | |
| *G01C 21/36* | (2006.01) | |

(52) U.S. Cl.
CPC .......... *G01C 21/3602* (2013.01); *G01S 19/47* (2013.01); *G05D 1/0011* (2013.01); *G05D 1/0088* (2013.01); *G06K 9/0063* (2013.01); *G06K 9/00805* (2013.01); *G06Q 10/083* (2013.01); *G06T 7/70* (2017.01); *B64C 2201/128* (2013.01); *G06T 2207/10032* (2013.01); *G06T 2207/30261* (2013.01)

(58) Field of Classification Search
CPC ....... B64C 39/024; B64C 39/00; B64C 39/04; B64C 39/39; B64C 2201/128; G01S 19/47; G05D 1/0011; G05D 1/0088; G05D 1/38; G06K 9/0063; G06K 9/00805; G06Q 10/083; H04W 4/00; H04W 4/021; H04W 12/06; G08G 5/00; G08G 5/0026; G08G 5/0069; G08G 5/006; G08G 5/0013; G08G 5/0034
See application file for complete search history.

(56) References Cited

U.S. PATENT DOCUMENTS

| | | | |
|---|---|---|---|
| 8,187,182 B2* | 5/2012 | Kahn | A61B 5/1038 |
| | | | 600/300 |
| 8,743,244 B2 | 6/2014 | Vartanian et al. | |
| 8,949,016 B1 | 2/2015 | Ferguson et al. | |
| 9,096,354 B2 | 8/2015 | Baudson et al. | |
| 9,150,224 B2 | 10/2015 | Yopp | |
| 9,177,481 B2 | 11/2015 | Wang et al. | |
| 9,336,506 B2 | 5/2016 | Shucker et al. | |
| 9,359,074 B2 | 6/2016 | Ganesh et al. | |
| 9,459,620 B1 | 10/2016 | Schaffalitzky | |
| 9,488,979 B1 | 11/2016 | Chambers et al. | |
| 10,007,992 B1* | 6/2018 | Harvey | G06T 7/0008 |
| 2005/0084975 A1 | 4/2005 | Armentrout | |
| 2005/0251324 A1 | 11/2005 | Wiener et al. | |
| 2007/0198159 A1 | 8/2007 | Durkos et al. | |
| 2008/0161987 A1 | 7/2008 | Breed | |
| 2012/0028680 A1 | 2/2012 | Breed | |
| 2012/0030133 A1 | 2/2012 | Rademaker | |
| 2012/0083982 A1 | 4/2012 | Bonefas | |
| 2012/0136895 A1 | 5/2012 | Johnson | |
| 2012/0314032 A1 | 12/2012 | Muensterer et al. | |
| 2013/0282208 A1 | 10/2013 | Mendez-Rodriguez et al. | |
| 2014/0032034 A1 | 1/2014 | Raptopoulos et al. | |
| 2014/0136414 A1* | 5/2014 | Abhyanker | G06Q 50/28 |
| | | | 705/44 |
| 2014/0180914 A1 | 6/2014 | Abhyanker | |
| 2014/0180959 A1 | 6/2014 | Gillen et al. | |
| 2014/0330456 A1 | 11/2014 | Morales et al. | |
| 2015/0006005 A1 | 1/2015 | Yu et al. | |
| 2015/0120094 A1 | 4/2015 | Kimchi et al. | |
| 2015/0149017 A1 | 5/2015 | Attard et al. | |
| 2015/0154559 A1 | 6/2015 | Barbush et al. | |
| 2015/0158599 A1 | 6/2015 | Sisko | |
| 2015/0253775 A1 | 9/2015 | Jacobus | |
| 2015/0336013 A1* | 11/2015 | Stenzler | A63G 31/00 |
| | | | 700/90 |
| 2015/0346722 A1* | 12/2015 | Herz | G05D 1/0038 |
| | | | 701/2 |
| 2016/0033966 A1 | 2/2016 | Farris et al. | |
| 2016/0107750 A1 | 4/2016 | Yates | |
| 2016/0146616 A1 | 5/2016 | Ren | |
| 2016/0179096 A1 | 6/2016 | Bradlow et al. | |
| 2016/0223345 A1 | 8/2016 | Thakur et al. | |
| 2017/0076610 A1* | 3/2017 | Liu | B64C 39/024 |
| 2017/0090271 A1 | 3/2017 | Harris et al. | |
| 2017/0235018 A1* | 8/2017 | Foster | B64C 39/024 |
| | | | 702/5 |

OTHER PUBLICATIONS

Jing Huang et al., Point Cloud Matching based on 3D Self-Similarity, 2012 IEEE Computer Society Conference on Computer Vision and Pattern Recognition Workshops, Jun. 16-21, 2012, IEEE.

Radu Bogdan Rusu et al., Aligning Point Cloud Views using Persistent Feature Histograms, 2008 IEEE/RSJ International Conference on Intelligent Robots and Systems, Sep. 22-26, 2008, IEEE.

Indoor Navigation Platform, Augmented Pixels, http://www.slideshare.net/augmentedpixels/indoor-navigation-platform, Sep. 8, 2015.

Andrea Cesetti et al., A Vision-Based Guidance System for UAV Navigation and Safe Landing Using Natural Landmarks, Journal of Intelligent and Robotic Systems, Jan. 2010, pp. 233-257, 57(1).

Ayanna Howard et al., Multi-Sensor Terrain Classification for Safe Spacecraft Landing, IEEE Transaction on Aerospace and Electronic Systems, Oct. 2004, vol. 40, Issue 4, pp. 1112-1131.

Navid Serrano et al., Landing Site Selection using Fuzzy Rule-Based Reasoning, Proceedings 2007 IEEE International Conference on Robotics and Automation, Apr. 10-14, 2007, IEEE.

Colin Theodore et al., Flight Trials of a Rotorcraft Unmanned Aerial Vehicle Landing Autonomously at Unprepared Sites, American Helicopter Society 62nd Annual Forum, Phoenix, AZ, May 9-11, 2006.

Connor A Theilmann, Integrating Autonomous Drones into the National Aerospace System, Senior Capstone Thesis, University of Pennsylvania School of Engineering and Applied Science, Department of Computer and Information Science, Apr. 29, 2015.

Sven Lange et al., Autonomous Landing for a Multirotor UAV Using Vision, Workshop Proceedings of SI MPAR 2008 International Conference of Simulation, Modeling, and Programming for Autonomous Robots, Nov. 2008, pp. 482-491.

Stephen M. Chaves et al., NEEC Research: Toward GPS-denied Landing of Unmanned Aerial Vehicles on Ships at Sea, Naval Engineers Journal, 2015, vol. 127, Issue 1, pp. 23-35.

Weiwei Kong et al., Autonomous Landing of an UAV with a Ground-Based Actuated Infrared Stereo Vision System, 2013 IEEE/RSJ International Conference on Intelligent Robots and Systems, Nov. 3-7, 2013.

Pal Moen Most, Visual Navigation of an autonomous drone, Master of Science in Informatics thesis at Norwegian University of Science and Technology Department of Computer and Information Science, Feb. 1, 2014.

Fabrizio Lamberti et al., Mixed Marker-Based/Marker-Less Visual Odometry System for Mobile Robots, International Journal of Advanced Robotic Systems, vol. 10, 2013.

Miguel A Olivares-Mendez et al., Fuzzy Controller for UAV-landing task using 3D-position Visual Estimation, 2010 IEEE International Conference on Fuzzy Systems (FUZZ), Jul. 18-23, 2010.

Abder Larranaga-Cepeda et al., On-line dense point cloud generation from monocular images with scale estimation, 13th Mexican International Conference on Artificial Intelligence, MICAI 2014, Tuxtla Gutiérrez, Mexico, Nov. 16-22, 2014. Proceedings, Part I.

Laura Wenus, Self Propelling Delivery Robots Testing in the Mission, Mission Local, Feb. 21, 2017.

\* cited by examiner

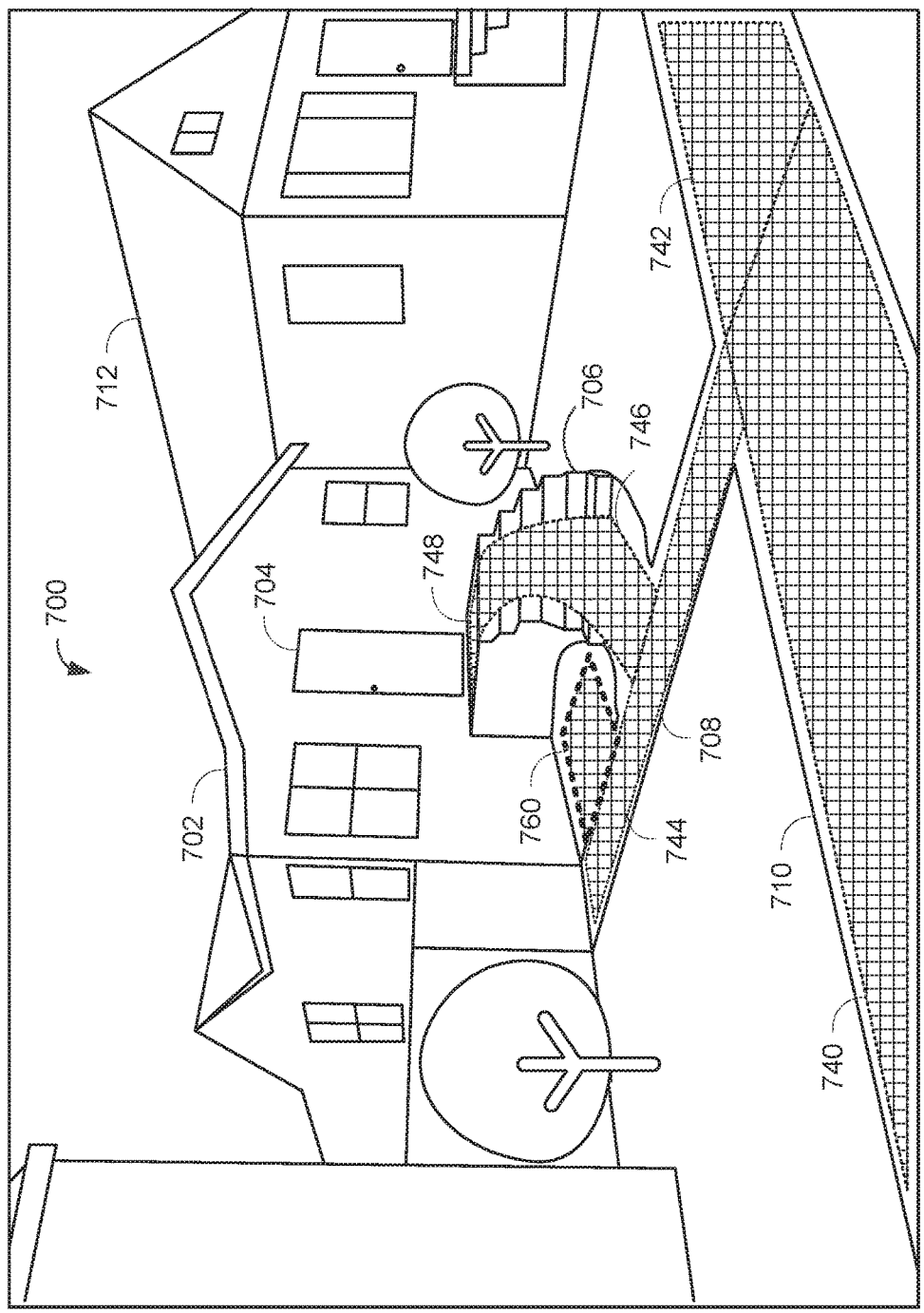

SYSTEMS AND METHODS FOR NAVIGATION PATH DETERMINATION FOR UNMANNED VEHICLES

BACKGROUND

Autonomous vehicles, also referred to as unmanned vehicles, are capable of travel without a physically-present human operator. Some autonomous vehicles may have the capability to operate in different modes, such as a remote-control mode, a partially autonomous mode, and an autonomous mode. During the remote-control mode, the vehicle may operate according to controls provided by a remotely positioned operator. Conversely, a control system may control navigation of the vehicle during the autonomous mode and the operator and control system may share controls of the vehicle during the partially autonomous mode. For instance, the operator may choose to let the control system handle navigation while providing non-navigation controls to complete a task, such as operating a mechanical system to physically deliver an object.

SUMMARY

Example implementations for navigation path determination are described herein. A vehicle capable of autonomous operation may be configured to navigate a location to perform a task, such as package delivery or pickup. In order to enable a vehicle to navigate the location, a computing system may receive video data that shows a demonstration path for navigating the location. Other types of sensor data representative of the demonstration path may be received as well, including global positioning system (GPS) data and inertial measurement unit (IMU) data. By processing the video data to identify permissible surfaces of the demonstration path (e.g., sidewalks, paved or unpaved walkways), the computing system may develop a navigation path that allows the vehicle to follow the same general path as the demonstration path while also allowing for variations from the demonstration path when needed due to the vehicle's locomotive capabilities and/or other potential reasons (e.g., the size of a package to deliver).

In one aspect, an example method is provided. The method includes receiving, at a computing system, video data showing a demonstration path for navigating a location. The method further includes identifying, using the video data, a set of permissible surfaces at the location, wherein each permissible surface was traversed by the demonstration path. The method additionally includes determining a navigation path for a vehicle to follow at the location, where the navigation path includes a variation from the demonstration path such that the variation causes the vehicle to stay within one or more permissible surfaces from the set of permissible surfaces. The method also includes causing, by the computing system, the vehicle to follow the navigation path to navigate the location.

In another aspect, an example system is provided. The system may include a vehicle and a control system configured to receive video data showing a demonstration path for navigating a location. The control system may be further configured to identify, using the video data, a set of permissible surfaces at the location, wherein each permissible surface was traversed by the demonstration path. The control system may additionally be configured to determine a navigation path for the vehicle to follow at the location, where the navigation path includes a variation from the demonstration path such that the variation causes the vehicle to stay within one or more permissible surfaces from the set of permissible surfaces. The control system may also be configured to cause the vehicle to follow the navigation path to navigate the location.

In a further aspect, a non-transitory computer readable medium is provided. The non-transitory computer readable medium has stored therein instructions executable by one or more processors to cause a computing system to perform operations. The operations include receiving video data showing a demonstration path for navigating a location. The operations further include identifying, using the video data, a set of permissible surfaces at the location, wherein each permissible surface was traversed by the demonstration path. The operations additionally include determining a navigation path for a vehicle to follow at the location, where the navigation path includes a variation from the demonstration path such that the variation causes the vehicle to stay within one or more permissible surfaces from the set of permissible surfaces. The operations also include causing the vehicle to follow the navigation path to navigate the location.

In a further example, a system is provided that includes means for receiving video data showing a demonstration path for navigating a location. The system further includes means for identifying, using the video data, a set of permissible surfaces at the location, wherein each permissible surface was traversed by the demonstration path. The system additionally includes means for determining a navigation path for a vehicle to follow at the location, where the navigation path includes a variation from the demonstration path such that the variation causes the vehicle to stay within one or more permissible surfaces from the set of permissible surfaces. The system also includes means for causing the vehicle to follow the navigation path to navigate the location.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 7E illustrates an example request for navigation path modification to overcome an obstacle associated with the navigation path shown in FIG. 7D.

DETAILED DESCRIPTION

Figure 1:
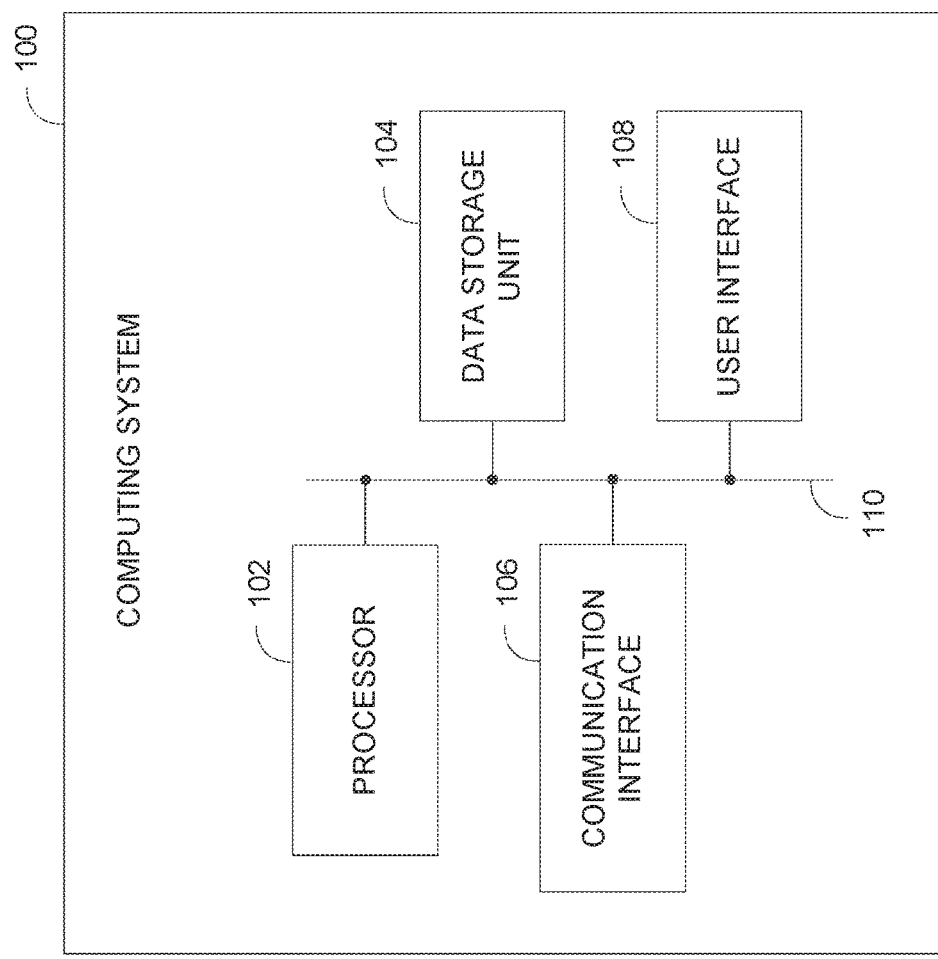
FIG. 1 is a simplified block-diagram of an example computing system.

The following detailed description describes various features and operations of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, aspects of the present disclosure, as generally described herein and illustrated in the figures, can be arranged, substituted, combined, separated, and designed in a wide variety of different configurations.

In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein. Further, unless otherwise noted, figures are not drawn to scale and are used for illustrative purposes only. Moreover, the figures are representational only and not all components are shown. For example, additional structural or restraining components might not be shown.

Improvements in technology have helped promote the package and materials transportation industry. With rising demand for shipping and delivery services, vehicles capable of remote control and autonomous operation are starting to be tested and used at different stages of the shipping process, such as the package pickup, transportation, and delivery stages. Although semi-autonomous and autonomous vehicles may offer some advantages over current techniques, a vehicle's autonomous control system may sometimes lack the ability to safely navigate and complete tasks without human assistance, especially in unfamiliar locations.

In some instances, an autonomous vehicle may receive a request to perform a delivery or some other task at an unfamiliar location. In such a circumstance, it may be beneficial to receive visual confirmation that delivery to the location is possible before attempting to deliver to the location. Additionally, in some situations, an autonomous control system may cause the vehicle to perform operations that a human would typically avoid, such as selecting and navigating routes through off-limit areas at the location (e.g., gardens, private walkways, or lawns). Therefore, it may be beneficial for the control system to receive data representing a preferred path for the vehicle to follow at the location.

Example systems and methods relate to navigation path determination for an autonomous vehicle. Several examples described herein discuss navigation paths used for vehicle delivery, but the methods are equally applicable to allow vehicles to navigate to perform other types of tasks, such as pickup, inspection, etc. In particular, in some instances, a computing system may develop a navigation path for a vehicle to follow at the location based on a demonstration path acquired and analyzed in video data provided by a user device (e.g., of an intended recipient of a package or another person or entity). For example, the computing system may acquire video data from an intended recipient that shows a demonstration path at the location that the recipient wants a given deliverer (e.g., delivery person, delivery vehicle) to follow. As an example illustration, in some implementations, a computing system may receive video data of a demonstration path that the recipient captured using a smartphone or other device configured with a camera (e.g., wearable device, drone).

In some examples, the demonstration path shown in the video data may encompass the route that the user (e.g., intended recipient) navigates at the location to illustrate how the user wants the deliverer to navigate the location. In particular, the demonstration path may include walkways, roads, trails, and other paths that the recipient deems permissible for either a delivery person or delivery vehicle to use. For example, a recipient capturing video data of the demonstration path may initially start at a general position located away from a target drop off spot and traverse a path from the general position to the target drop off spot. To further illustrate, the demonstration path may be shown in video data as starting from a road at the location, extending up a driveway from the road until reaching a walkway that leads to the recipient's front door of a house. In such an illustration, the video data may convey to the computing system that the recipient wants the deliverer to use the driveway and walkway in order to drop off deliveries at the front door of the recipient's house. In other examples, the demonstration path may show a path that involves traveling up stairways, using elevators, opening doors or gates of fences, or performing other tasks to reach a desired drop off location where the recipient wants to receive deliveries.

The video data showing the demonstration path may depict the paths used or suggested for use by the recipient, including physical features of the paths and boundaries associated with the path. For instance, the video data may enable the computing system to identify that portions of the demonstration path correspond to a paved or otherwise solid surface and forms boundaries with grass located on both sides of the path. In some cases, the video data may even depict potential obstacles that are located nearby the demonstration path, including doors or gates that a delivery vehicle may encounter.

In some implementations, the video data may convey the demonstration path starting from the target drop off spot at the location and extend away from the drop off spot towards a starting spot where a deliverer may initially start following the demonstration path, such as a general position at a boundary of the location. As an example illustration, a recipient may start capturing video data showing a drop off spot positioned at the door of his office and further capture video data of a demonstration path extending from the door of his office, down the hallway to an elevator bank, down an elevator, and from the elevator out to a front door of the office building. In this example, the video data may convey to the computing system an internal path that a delivery vehicle may follow when performing a delivery that requires entering into the office building. Furthermore, the example also demonstrates how, in some examples, the computing system may receive and process video data that begins by showing the demonstration path starting at the drop off location and extending away from the drop off location rather than video data that ends depicting the demonstration path at the drop off location.

Other example implementations may involve a computing system receiving video data that shows demonstration paths leading through various environments. In some instances, the video data may convey a landing spot that the recipient deems allowable for aerial delivery vehicles to utilize. For example, the computing system may receive video data that shows an open space positioned in the backyard of the recipient that the recipient indicates should be used for an aerial delivery vehicle to complete a delivery. In such an example, the computing system may determine that an aerial delivery vehicle may engage the recipient's backyard even though in other examples yards are often off-limit areas. As shown, video data capturing and depicting demonstration paths for delivery vehicles to utilize can vary depending on the desires of the recipient as well as the physical layout of the location.

In some examples, the computing system may receive sensor data from the recipient's device that supplements the video data depicting the demonstration path. For example, the computing system may receive measurements related to the movement of the recipient's device from an inertial measurement unit (IMU). The movement measurements may indicate the device's current rate of acceleration during different portions of the demonstration path as well as other information, such as changes in the rotational attributes (i.e., pitch, roll, and yaw) of the device. In some cases, the computing system may receive the movement measurements in an alignment with corresponding portions of video data depicting the demonstration. If this is the case, the computing system may utilize the measurements and video data without having to perform additional processes to align the information. In other cases, however, the computing system may be required to determine a mapping between the measurements and corresponding portions of video data received from the device in order to associate the device's movements at the right points along the demonstration path.

In another implementation, the computing system may receive global positioning system (GPS) measurements from the recipient's device that supplement the video data. In particular, the computing system may receive GPS waypoints that are sets of coordinates that identify points along the demonstration path at the location. For instance, each GPS waypoint may indicate a position along the demonstration path in terms of longitude and latitude indications. This way, the video data may convey the demonstration path and further be supplemented by the GPS waypoints that may serve as checkpoints for a delivery vehicle to confirm that the delivery vehicle is on the correct path. Additionally, the GPS waypoints may also further enhance the computing system's understanding of the demonstration path at the location during development of a navigation path suitable for delivery vehicles to utilize. In some examples, individual video frames may be synchronized with corresponding GPS coordinates to facilitate generation of a navigation path. The computing system may also develop the navigation path such that the path connects all or a set of the GPS waypoints received from the recipient's device.

After receiving video data and possibly other information from the recipient's device, the computing system may process and analyze the information to determine a navigation path for a delivery vehicle to follow to complete a delivery. In some situations, the computing system may need to develop a navigation path that includes variations from the demonstration path depicted in the video data. For instance, the computing system may need to develop the navigation path in a way that is suitable for a delivery vehicle to follow. The delivery vehicle may require a wider navigation path than some portions of the demonstration path due to the physical structure of the delivery vehicle compared to the recipient. Similarly, in some instances, the navigation path may require variations due to the delivery vehicle's inability to traverse a portion of the demonstration path in a manner that reflects how the recipient traversed the path. As an example illustration, the navigation path may include a variation that avoids stairs climbed by the recipient when illustrating the demonstration since the delivery vehicle may not have the capabilities to traverse stairs. Other factors may influence differences between the navigation path and the demonstration path. For instance, the size or configuration of the object(s) being delivered may require that the navigation path includes some differences from the demonstration path depicted in the video data.

In order to develop the navigation path, the computing system may process the information received from the recipient's device using computer vision techniques that enable the computing system to build an understanding of the location, the demonstration path, and the drop off location. In some instances, a computer vision process performed by the computing system may involve acquiring, processing, and analyzing the digital images within the video data in order to formulate potential decisions. In particular, the computing system may use image segmentation to identify boundaries defining a set of permissible surfaces at the location that the navigation path may incorporate and utilize. To further illustrate, a permissible surface may be a surface that was traversed by the recipient during video capture of the demonstration path. For example, permissible surfaces may often include paved or unpaved surfaces, such as roads, sidewalks, walkways, trails and other paths that are depicted as part of the demonstration path in the video data. In many situations, the recipient may include these types of surfaces within a demonstration path because a delivery vehicle may travel upon these surfaces without causing damage to the surfaces. These surfaces differ from other types of surfaces and areas that a computing system may determine are off-limits, such as yards, gardens, and rocky-terrains, etc., which may be damaged by the weight and size of a delivery vehicle. In some situations, however, the computing system may determine that the recipient clearly intends for a delivery vehicle to travel a path through an area that is typically off-limits. For example, the demonstration path shown in video data may clearly express that the recipient wants a delivery vehicle to travel through a field or yard despite the possibility that the vehicle may leave marks in those areas. Thus, in order to formulate a navigation path suitable for completing a delivery at the location that resembles a recipient's demonstration path, the computing system may identify permissible areas based on the demonstration path using the video data.

In some examples, the computing system may further enable the recipient to provide annotations that assist in the development of the navigation path. For instance, the computing system may provide an interface that allows the recipient to indicate which paths are permissible and which areas are off-limits to a delivery vehicle. In another example, the computing system may provide an indication of a determined navigation path to the device of the recipient enabling the recipient to review the navigation path before the delivery vehicle performs the delivery. In the example, the recipient may provide annotations that include adjustments to the navigation path where the recipient deems are needed.

After determining the navigation path, the computing system may cause a delivery vehicle to follow the navigation path to complete the delivery at the location. In some examples, the role of the computing system may determine how the computing system causes the delivery vehicle to follow the navigation path. For instance, in some implementations, the computing system may serve as the control system of a given delivery vehicle. In this situation, the computing system may cause the delivery vehicle to follow the navigation path by providing navigation instructions to systems of the vehicle. For instance, the computing system may follow the navigation path while also measuring the vehicle's surrounding environment using sensors to avoid obstacles and keep on the right path. In another example implementation, the computing system may operate as a system configured to organize and dispatch a group of delivery vehicles to complete deliveries at multiple locations. As such, the computing system may provide instructions to a given delivery vehicle to complete a delivery at a location that include the navigation path. In some cases, the computing system may select a particular vehicle to complete the delivery based on numerous factors, such as the capabilities of the vehicle, parameters of the navigation path, the vehicle's current location and delivery schedule, and/or the size and configuration of the objects being delivered.

In a further example, a computing system may estimate an amount of time that a delivery vehicle may use to navigate a determined navigation path, which may depend on various factors, such as the length and complexity of the navigation path, the type and capabilities of the delivery vehicle, weather conditions at the location (e.g., snow, rain), and/or the type of object being delivered, among other potential factors. The time estimation may enable the computing system to organize the delivery in a more efficient manner. For instance, the computing system may provide an estimated delivery time to the recipient based on the estimated amount of time that the delivery vehicle may take. In an example, the computing system may use the estimated delivery time to coordinate when to drop off a delivery vehicle to perform the delivery and when to pick up the delivery vehicle after completion. For instance, in an example involving a truck or other vehicle dispatching multiple delivery vehicles to complete deliveries in an a given area, the computing system may determine the truck's drop off schedule and pick up schedule using the estimated delivery times for the different locations.

In some situations, a computing system may need to adjust the navigation path during execution of the delivery. For instance, the delivery vehicle may encounter an obstacle positioned in the navigation path. In such a case, the computing system may analyze the situation, including determining whether the delivery vehicle can remain on a permissible surface and circumnavigate the obstacle while still following the navigation path. In some instances, the computing system may use sensor data to avoid the obstacle while staying within the navigation path. In other instances, however, the computing system may determine that the obstacle prevents the delivery vehicle from completing the delivery unless the delivery vehicle temporarily navigates into an off-limit area to avoid the obstacle. For example, the computing system may determine that a tree has fallen onto a walkway used for the navigation path and that the delivery vehicle cannot complete the delivery without navigating a path off the walkway around the tree. If this is the case, the computing system may send a query to the device of the recipient that requests to allow the delivery vehicle to temporarily leave the walkway and navigation path to circumnavigate the tree via an off-limit area (e.g., the yard). This way, the computing system may receive approval prior to providing instructions to the delivery vehicle to enter into an off-limit area. In some instances, the computing system may even enable the recipient to select a path for the delivery vehicle to follow that circumnavigates the obstacle. Other potential scenarios are possible where the computing system may adjust a determined navigation path.

Within examples, vehicles used to complete requested tasks may correspond to various types of vehicles, including traditional (e.g., trucks, forklifts, cars, tractors), and non-traditional vehicles (e.g., robots, unmanned aerial vehicles). For instance, a vehicle that may be used to perform deliveries may resemble a four-wheeled vehicle, but can also be a robotic device (e.g., biped, quadruped) or an aerial vehicle (e.g., biplane, multicopter). Additionally, as indicated above, one or more vehicles may be part of a group of vehicles organized and dispatched by a system that receives requests and assigns the tasks to the vehicles accordingly. In particular, the system may include one or more computing systems that communicate to organize vehicles according to capabilities and/or location to complete requested tasks. For example, the system may receive delivery requests and select vehicles to complete the delivery requests based on the delivery locations, the locations and types of the packages to be shipped, and/or the current or future locations and capabilities of the vehicles, among other factors.

Referring now to the figures, FIG. 1 is a simplified block-diagram of example computing system 100 that can perform various acts and/or functions, such as those described in this disclosure. Computing system 100 can serve as a control system for an autonomous or partially-autonomous vehicle, such as a ground-vehicle, aerial vehicle, robotic device, etc., and can include various components, such as processor 102, data storage unit 104, communication interface 106, and/or user interface 108. The components as well as other possible components may connect to each other (or to another device, system, or other entity) via connection mechanism 110, which represents a mechanism that facilitates communication between two or more devices, systems, or other entities. As such, connection mechanism 110 can be a simple mechanism, such as a cable or system bus, or a relatively complex mechanism, such as a packet-based communication network (e.g., the Internet). In some instances, a connection mechanism can include a non-tangible medium (e.g., where the connection is wireless). In a further implementation, computing system 100 can include more or fewer components, including components not shown in FIG. 1.

Processor 102 may correspond to a general-purpose processor (e.g., a microprocessor) and/or a special-purpose processor (e.g., a digital signal processor (DSP)). In some instances, computing system 100 may include a combination of processors.

Data storage unit 104 may include one or more volatile, non-volatile, removable, and/or non-removable storage components, such as magnetic, optical, or flash storage, and/or can be integrated in whole or in part with processor 102. As such, data storage unit 104 may take the form of a non-transitory computer-readable storage medium, having stored thereon program instructions (e.g., compiled or non-compiled program logic and/or machine code) that, when executed by processor 102, cause computing system 100 to perform one or more acts and/or functions, such as those described in this disclosure. Such program instructions can define and/or be part of a discrete software application. In some instances, computing system 100 can execute program instructions in response to receiving an input, such as from communication interface 106 and/or user interface 108. Data storage unit 104 may also store other types of data, such as those types described in this disclosure.

Communication interface 106 can allow computing system 100 to connect to and/or communicate with another other entity according to one or more protocols. For instance, communication interface 106 may enable computing system 100 to receive requests, information, and otherwise generally communicate with other devices. The requests and communication may correspond to requests to perform tasks, such as object pickups and/or deliveries. In an example, communication interface 106 can be a wired interface, such as an Ethernet interface or a high-definition serial-digital-interface (HD-SDI). In another example, communication interface 106 can be a wireless interface, such as a cellular or WI FI interface. A connection can be a direct connection or an indirect connection, the latter being a connection that passes through and/or traverses one or more entities, such as such as a router, switcher, or other network device. Likewise, a transmission can be a direct transmission or an indirect transmission.

User interface 108 can facilitate interaction between computing system 100 and a user of computing system 100, if applicable. As such, user interface 208 can include input components such as a keyboard, a keypad, a mouse, a touch sensitive panel, a microphone, and/or a camera, and/or output components such as a display device (which, for example, can be combined with a touch sensitive panel), a sound speaker, and/or a haptic feedback system. More generally, user interface 108 can include hardware and/or software components that facilitate interaction between computing system 100 and the user of the computing device system. In some implementations, communication interface 106 and user interface 108 may enable a human-operator positioned remotely to communicate with computing system 100. For instance, computing system 100 may enable the operator to provide controls to navigate or control other operations of vehicle controlled by computing system 100.

Figure 2:
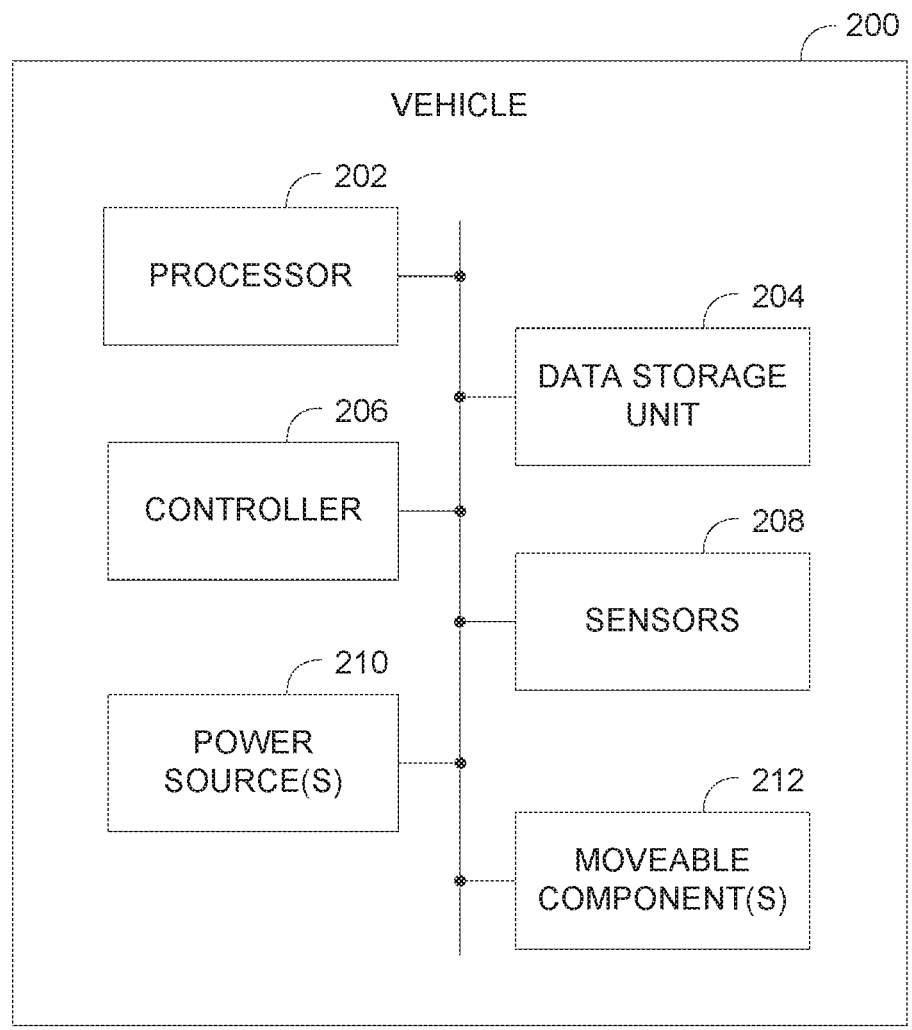
FIG. 2 is a simplified block-diagram of an example vehicle

FIG. 2 is a simplified block-diagram of example autonomous vehicle system 200, which represents one possible configuration of an autonomous or partially-autonomous vehicle capable of performing processes and operations described herein. Within implementations, vehicle system 200 may correspond to a ground-oriented vehicles, robots, or aerial vehicles, among other possibilities. As shown in FIG. 2, vehicle system 200 includes processor 202, data storage unit 204, controller 206, sensors 208, power source(s) 210, and movable component(s) 212, but may include more or fewer components arranged and connected in any manner without departing from the scope of the disclosure. For instance, components included within system 200 may form a control system (e.g., computing system 100) capable of controlling one or more operations of vehicle.

Similar to processor 102 shown in FIG. 1, processor 202 may be a general-purpose processor or a special purpose processor (e.g., digital signal processors, application specific integrated circuits, etc.), and may be configured to execute computer-readable program instructions stored in data storage unit 204 that are executable to provide the functionality of system 200. The program instructions may be executable to provide functionality of controller 206, which may be configured to instruct an actuator or other component of system 200 to cause movement of one or more movable component(s) 212, among other operations. Data storage unit 204 may include or take the form of one or more computer-readable storage media that can be read or accessed by processor 202. The computer-readable storage media can include volatile and/or non-volatile storage components, such as optical, magnetic, organic or other memory or disc storage, which can be integrated in whole or in part with processor 202. In some implementations, data storage 204 can be implemented using a single physical device (e.g., one optical, magnetic, organic or other memory or disc storage unit), while in other implementations, data storage 204 can be implemented using two or more physical devices. Further, data storage 204 may also include additional data such as diagnostic data, among other possibilities. In some implementations of system 200, processor 202, data storage 204, and/or controller 206 may operate as part of a control system configured to control one or more operations of system 200.

Vehicle system 200 may include one or more sensors 208, such as force sensors, proximity sensors, load sensors, position sensors, capacitive sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others.

The amount and type of sensors 208 may vary depending on the configuration and uses of system 200. For example, sensors 208 may provide sensor data to processor 202 to enable vehicle system 200 to operate within an environment. Sensors 208 may also measure aspects of system 200, including monitoring functionality and detecting potential component errors. In some examples, sensors 208 may enable a control system (e.g., computing system 100) of vehicle system 200 to measure aspects of a target location in order to perform one or more tasks at the location. For example, the control system may use sensor data to navigate the target location, avoid obstacles, and to perform other operations, such as handling objects. In a further example, vehicle system 200 may include one or more sensors 208 configured to measure the weather to assist in determining strategies for completing tasks. In addition, sensors 208 may also capture and provide audio and/or video (and possibly other types of information) to a remotely positioned operator that can use the information to control vehicle system 200.

Vehicle system 200 may also include one or more power source(s) 210 configured to supply power to various components of vehicle system 200. Any type of power source may be used such as, for example, a gasoline engine or a battery. Vehicle system 200 may also include a transmission system that may be coupled to portions of the hardware of vehicle system 200. In some examples, the transmission system may include components, such as clutches, differentials, pulleys, cables, belts, drive shafts, and/or other possible elements. As such, the transmission system may change speed, torque, and direction of rotation of hardware components of vehicle system 200.

Vehicle system 200 may further include one or more actuators, which can produce mechanical motion. In particular, an actuator may be configured to convert stored energy into movement of one or more components. For instance, actuators may be powered by chemicals, compressed air, hydraulics, or electricity, among other possibilities. With this arrangement, actuators and/or the transmission system may cause movement of various movable component(s) 212, which may include appendages, such as robotic arms or other mechanical structures. For instance, actuators may enable an actuator to lift and move an object (e.g., pick up and drop off a package). Further, moveable component(s) 212 may also include a movable base, wheels, grippers, tools and/or end effectors, among others. Moveable component(s) 212 may enable vehicle system 200 to complete a variety of tasks.

It is important to note that the configuration and components of vehicle system 200 may vary within examples, which can depend on the type and abilities of vehicle system 200. For instance, an aerial vehicle system may include other components that enable aerial navigation and particular sensors that assist the aerial vehicle complete particular tasks suitable for aerial vehicles.

Figure 3:
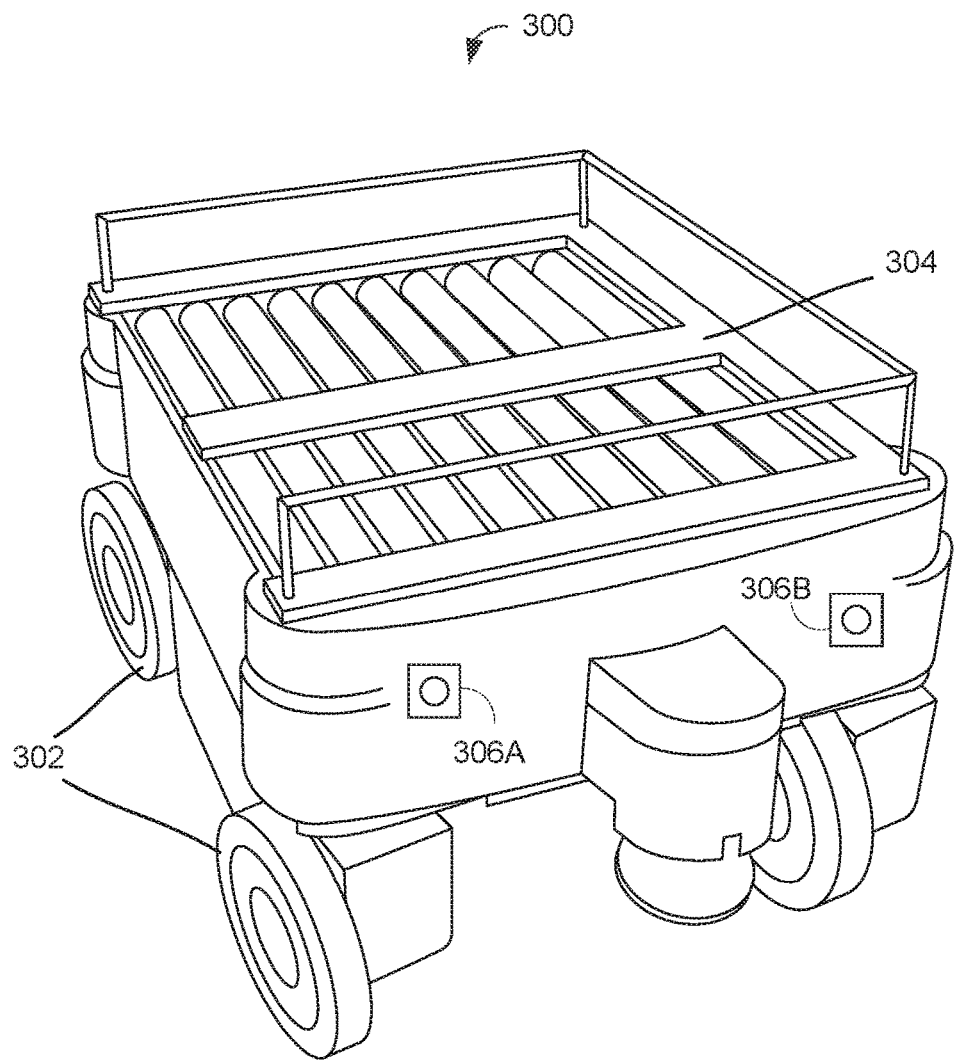
FIG. 3 illustrates an example vehicle.

FIG. 3 illustrates example delivery vehicle 300, which represents one type of ground vehicle that may perform operations discussed herein. For instance, vehicle 300 may be a physical representation of vehicle system 200 shown in FIG. 2 and is shown configured with additional features, such as wheels 302, cargo bed 304, and sensors (sensor 306A, sensor 306B). In other examples, vehicle 300 may have more or fewer components, including one or more components not shown in FIG. 3, such as a control system and/or one or more manipulators configured to handle objects.

As indicated above, vehicle 300 may include a computing system and sensors (sensor 306A, 306B) that enable vehicle 300 to operate in multiple modes, such as an autonomous, partially autonomous, and remote mode. When operating in an autonomous or partially autonomous mode, the control system (e.g., computing system 100) may control one or more operations of vehicle 300, such as navigation strategy (e.g., route planning), obstacle avoidance, and object manipulation. The control system may use information from various sources to determine control strategies, including information obtained from memory (e.g., storage physically on vehicle 300 and/or cloud storage memory), from other systems or devices (e.g., map from a server system), and from sensors (e.g., sensors 306A, 306B). The control system may also operate according to instructions provided by a device associated with a remote operator.

When operating in a remote-control mode, an operator may assume direct control of one or more operations of vehicle 300. For example, the operator may provide control instructions based on sensor data (e.g., images, video, GPS coordinates) from sensors (e.g., sensors 306A-306B) positioned on vehicle 300. In some instances, the operator and control system may share partial control of vehicle 300. For instance, the operator may control navigation of vehicle 300 while the control system controls manipulators positioned on vehicle 300.

A communication system of vehicle 300 may communicate with other devices. For instance, the communication system may enable the control system to receive video data and other information from other devices to enable the control system to formulate strategies for performing operations. The communication system of vehicle 300 may also enable vehicle 300 to perform instructions received from a system configured to organize a group of delivery vehicles.

During operation, vehicle 300 may navigate using wheels 302. Example wheels may exist in various materials and may include a single wheel, double wheel, compound wheel, castor wheel, or any other wheel configured to rotate to move vehicle 300. Additionally, in some examples, wheels 302 may include an energy-absorbing material (e.g., rubber, etc.) to facilitate operation and/or maintenance of wheels 302. For examples, wheels 302 may include a tire coupled to a rim of each wheel. In other examples, vehicle 300 may include other mechanics that enable locomotion, such as caterpillar tracks.

Cargo bed 304 is a mechanical component of vehicle 300 that may carry packages and other objects. As such, cargo bed 304 may include mechanics can assist moving an object, such as rollers that may push objects off vehicle 300 or a mechanical actuator that may lift and position objects (not shown). Although vehicle 300 includes cargo bed 304, other types of ground vehicles may have other physical configurations and attributes that differ from vehicle 300. In particular, other types of vehicles may have configurations that depend on the tasks that the vehicles are used to perform. For example, another example ground vehicle may include seating that permits the vehicle to transport passengers.

Vehicle 300 further includes sensors 306A, 306B to capture information of the vehicle's surrounding environment and/or operations of components of vehicle 300. Sensors 306A, 306B may correspond to various types of sensors and may assist a control system and/or human operator performs operations using vehicle 300. Vehicle 300 may also include other types of sensors not shown in FIG. 3.

Figure 4:
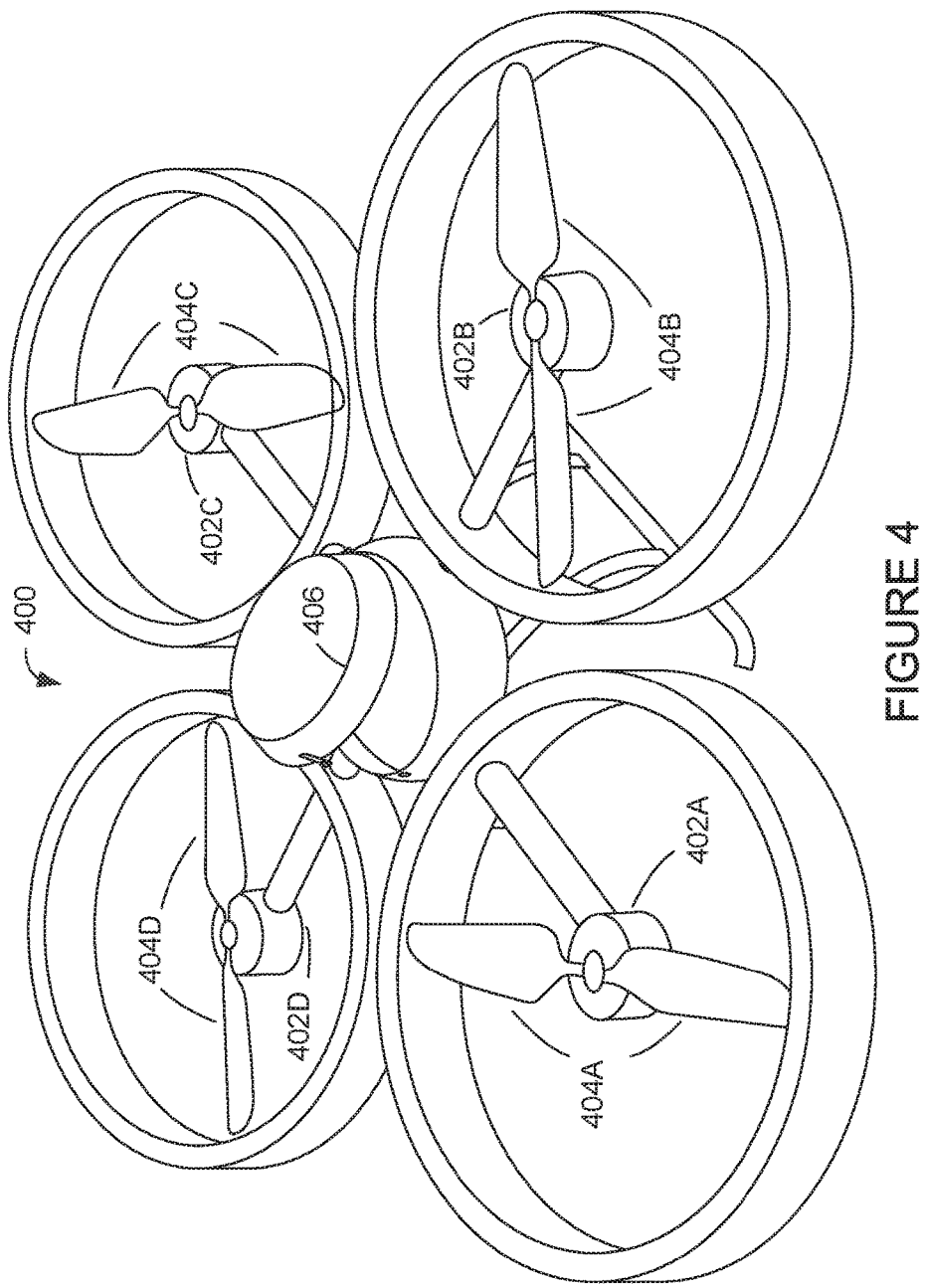
FIG. 4 illustrates another example vehicle.

FIG. 4 illustrates another example delivery vehicle 400, which represents another type of vehicle capable of performing operations discussed herein. Unlike vehicle 300, vehicle 400 represents an example aerial vehicle that may navigate between locations by traveling in the air. Although vehicle 400 is shown as a type of multicopter, other types of aerial vehicles may also perform operations described herein.

As shown in FIG. 4, vehicle 400 includes four rotors 402A, 402B, 402C, 402D configured to provide propulsion and maneuverability to vehicle 400 using power from motor 406. More specifically, rotor 402A includes blades 404A, rotor 402B includes blades 404B, rotor 402C includes blades 404C, and rotor 402D includes blades 404D. With this configuration, rotors 402A-402D may enable vehicle 400 to take off and land vertically, maneuver in all directions, and hover, among other possible operations. For instance, vehicle 400 may adjust the pitch of the blades to control its pitch, roll, yaw, and altitude. In another example, vehicle 400 may have a different configuration, such as multiple motors.

Vehicle 400 may further include mechanical components configured to manipulate and hold objects. For example, vehicle 400 may include a mechanical arm that may pick up and hold items during deliveries. Additionally, vehicle 400 may also include various sensors, such as cameras, tactile sensors, and landing sensors, etc.

Figure 5:
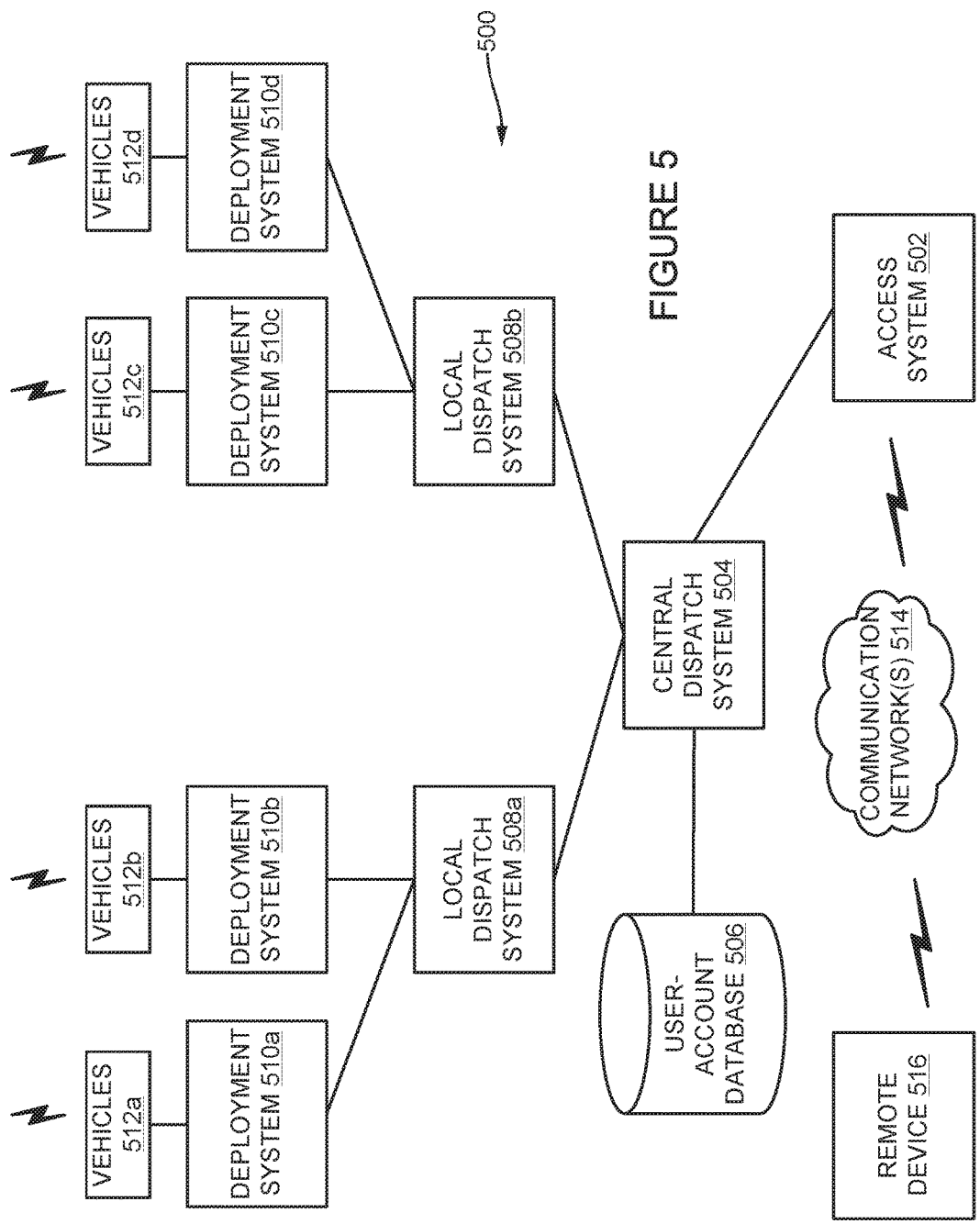
FIG. 5 illustrates an example system for organizing and dispatching a group of vehicles.

FIG. 5 illustrates example system 500 for organizing and dispatching a group of delivery vehicles. System 500 represents an example configuration of a network of stations and computing systems arranged to receive task requests that specify locations, process the requests, and dispatch vehicles to complete the tasks accordingly. Other example systems may have other configurations, including more or fewer elements.

As shown in FIG. 5, system 500 involves connections between various elements, including access system 502, central dispatch system 504, user-account database 506, local dispatch system(s) 508*a-b*, deployment system(s) 510*a-d*, vehicle(s) 512*a-d*, communication network(s) 514, and remote device(s) 516. Each element shown in FIG. 5 may represent one or more elements. For instance, access system 502 may correspond to multiple access systems in another implementation. Additionally, in other example implementations, elements may be combined or interconnected in other ways. For instance, central dispatch system 504 may be combined with access system 502 and user-account database 506 in other examples. The elements within system 500 may connect in other ways not shown in FIG. 5.

In some examples, system 500 may dispatch vehicle(s) 512*a-d* to provide services across a large geographic area (e.g., that is much larger than the travel range of any single vehicle). Vehicle(s) 512*a-d* may include various types of autonomous and semi-autonomous vehicles capable of performing different tasks. For example, vehicle(s) 512*a-d* may include ground-type vehicles (e.g., vehicle 300, robotic devices), aerial vehicles (e.g., vehicle 400), and other possible types. By having different vehicle(s) 512*a-d* available at multiple locations, system 500 may dispatch particular vehicles to perform tasks based on a vehicle's capabilities, among other factors. For example, system 500 may select a ground-type vehicle (e.g., vehicle 300) to deliver heavy packages or materials and an aerial vehicle (e.g., vehicle 400) to deliver a small package to a remote location.

Access system 502 may enable and help facilitate initial communication with system 500. For example, access system 502 may receive task requests for one or more elements of system 500 to process, organize, and dispatch vehicle(s) 512*a-d* to complete. Access system 502 may include an interface that enables operators to request and possibly control vehicle(s) 512*a-d*. As shown in FIG. 5, access system 502 may relay information to central dispatch system 504, which may further organize and coordinate vehicle(s) 512*a-d* to be dispatched. Similar to access system 502, central dispatch system 504 may correspond to a computing system or network of computing systems that can provide instructions to local dispatch system(s) 508*a-b* and/or directly to deployment system(s) 510*a-d*. To provide such functionality, central dispatch system 504 may communicate with access system 502 and other elements of system 500 via a data network, such as the Internet or a private network.

Central dispatch system 504 may coordinate vehicle(s) 512*a-d* positioned at different local dispatch system(s) 508*a-b*. For example, central dispatch system 504 may analyze the locations, availability, task assignments, and other information regarding vehicle(s) 512*a-d* to determine dispatching instructions. Similar to central dispatch system 504, local dispatch system(s) 508*a-b* may perform operations relating to organizing and facilitating dispatching of vehicle(s) 512*a-d* and may further communicate instructions to deployment system(s) 510*a-d*.

Deployment systems 510*a-d* may arrange deployment of vehicle(s) 512*a-d* and may also provide additional functions, such as diagnostic-related functions (e.g., verifying system functionality of each vehicle), ensuring each vehicle receives objects or other information related to instructed tasks, and/or maintaining devices or other items that are housed in the vehicle (e.g., by monitoring a status of a payload such as its temperature, weight, etc.). In some implementations, deployment systems 510*a-d* and their corresponding vehicle(s) 512*a-d* (and possibly associated local dispatch system(s) 508*a-b* may be strategically distributed throughout an area such as a city. For example, deployment systems 510*a-d* may be strategically distributed proximate to one or more pickup locations (e.g., near a restaurant, store, or warehouse).

Remote device 516 represents any device that may communicate with access system 502 and/or other elements of system 500 via communication network(s) 514. For example, remote device 516 may correspond to smartphones, applications, software, websites that may communicate with access system 502 (or a human operator operating at access system 502). In some examples, remote device 516 may enable a user to request for system 500 to dispatch a vehicle to complete a request (e.g., deliver a package). System 500 may also include user-account database 506. For a given user account, the user-account database 506 may include data related to or useful in providing services. The user data associated with each user account may be optionally provided by an associated user and/or collected with the associated user's permission.

In addition to the various elements discussed above, system 500 may place interveners (not shown) (e.g., people, robotic devices) that may repair or recover vehicles experiencing a failure. Reset tasks may be generated for a marketplace that incentivizes interveners to go to places where assistance is needed to restart dead vehicles, robots, or recover downed drones. Different tasks may be assigned to particular interveners based on intervener qualification levels.

In some examples, system 500 may operate as a hybrid delivery model that may simultaneously plan to complete deliveries using human deliverers and vehicle deliverers. For instance, the human deliverers may serve a dual role of delivering packages and being well-positioned to assist vehicles (e.g., provide in-person assistance). For instance, to deliver to a grid covering an entire neighborhood, delivery vehicles may be interleaved to focus on small sections of the grid at a time with humans placed central to each group of vehicles to provide quick assistance when needed. In another example, a grid of area may be divided into long slices for each vehicle rather than separate quadrants. The vehicles may then all progress in the same direction so that a human intervener can easily be positioned to assist any failing vehicle in the group. Other example configurations involving vehicles and humans dynamically to complete deliveries may exist.

In a further example, system 500 may include one or more elements configured to oversee one or more vehicles that can be operated remotely by a device or system associated with the truck that deployed the vehicles. This way, vehicle(s) 512*a-d* can include some vehicles that do not require full sensing and planning systems to complete tasks. Rather, the more cost efficient vehicles may perform operations according to plans provided remotely by a system or operator positioned at the deploying truck or another location. For example, a high-bandwidth pipe to the truck may be leveraged so that only a cheap link to each delivery vehicle is needed. In some instances, the deployment truck may also have its own gantry vehicle or robot to load up the delivery vehicle with packages before the vehicle is deployed for delivery. Additionally, the truck may launch a single vehicle, multiple vehicles, or different types of vehicles.

In further examples, system 500 may plan routes for a given deploying truck and optimize the routes based on expected times for delivery vehicles to deliver a package and return to the truck. For example, the truck may be configured to continually move through an area, dropping off and picking up vehicles as it goes. Such a system may be particularly advantageous when individual delivery vehicles are particularly slow and/or when certain delivery locations may be difficult to reach. A control system may be responsible for dynamic simultaneous adjustment of route plans for both the individual delivery vehicles and the deploying truck.

Figure 6:
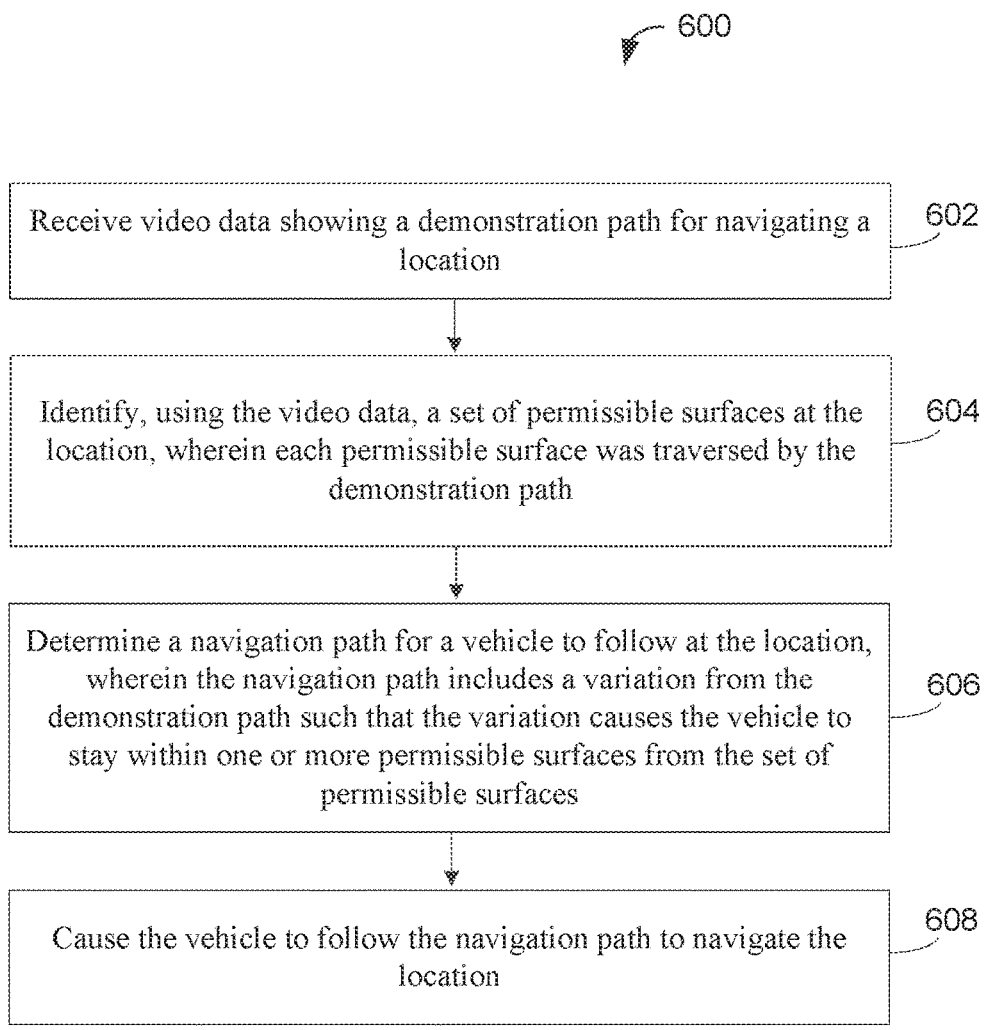
FIG. 6 is a flowchart that shows an example method for navigation path determination.

FIG. 6 is a flowchart illustrating method 600 for navigation path determination, which represents an example method that may include one or more operations, functions, or actions, as depicted by one or more of blocks 602, 604, 606, and 608, each of which may be carried out by a computing device (e.g., computing system 100), but other systems can also be used. Those skilled in the art will understand that the flowchart described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. In examples, a computing system may perform one or more blocks of method 600. For instance, the computing system may correspond to the control system of a delivery vehicle or may correspond to a system (e.g., system 500) configured to organize and provide instructions to a delivery vehicle's control system.

At block 602, method 600 may include receiving video data showing a demonstration path for navigating a location. A computing system (e.g., computing system 100, system 500) may receive video data from a user device, e.g., the device of an intended recipient of a delivery or other device capable of recording or streaming video data. For instance, the computing system may receive video data showing a demonstration path at a location from the recipient's smartphone, wearable computing device, camera, or other type of device.

The demonstration path may correspond to a route that traverses areas of the location and enables a deliverer (e.g., delivery person, delivery vehicle) to complete a delivery. In particular, the demonstration path represents surfaces that the recipient approves a delivery vehicle using and may often include walkways, roads, sidewalks, and other permissible surfaces that the recipient indicates a delivery vehicle should use. For example, a demonstration path may start at a general position somewhere near or on the premises of the location and extend from the first general position along permissible surfaces to a drop off position where the recipient wants the object (e.g., package, materials) delivered. To further illustrate, in some examples, the recipient may initially start obtaining video data nearby a main road positioned proximate to the location and capture video data that extends from the initially starting point and further includes walkways or other surfaces that the recipient traverses until reaching a drop off spot for the completing the delivery (e.g., a door of a house at the location).

Additionally, in some instances demonstration path shown in video data may initially start at the drop off position and extend from the drop off position out to a boundary or nearby general position at the location. For example, instead of starting away from the drop off position, the recipient may initially start obtaining video data at a drop off position at her location (e.g., front door of her house) and capture video data that extends from the drop off position along walkways or other permissible surfaces until reaching a general position away from the drop off position accessible to delivery vehicles (e.g., public road).

In some example implementations, the computing system may receive additional data from the device along with the video data showing the demonstration path at the location. For instance, one or more sensors positioned on the device may capture sensor data while the device captures video data, such as GPS waypoints and measurements of the device's movements. As such, the device may provide the sensor data along with the video data to the computing system.

In some cases, the computing system may receive sensor data and video data from the device in an unaligned format. As a result, the computing system may determine a mapping between the sensor data and corresponding portions of the video data to enable the computing system to utilize the sensor data along with the video data when developing the navigation path for a vehicle to use at the location. In some examples, the computing system may cause the vehicle's control system to compare its sensor data to the received sensor data as the vehicle navigates the determined navigation path.

In an example, the computing system may receive movement measurements from an IMU of the device. For instance, the device's IMU may measure the videographer's specific force, angular rate, and possibly magnetic field surrounding the recipient that handling the device using a combination of accelerometers, gyroscopes, and/or magnetometers. As such, the IMU may capture measurements as the recipient moves the device along the demonstration path such that the measurements of the device's position, acceleration, changes in orientation, etc., can reflect movements of the devices during the capture of different portions of video data. As a result, the computing system may utilize the movement information to enhance the delivery process. As an example, the computing system may include indications of changes in movement within the instructions to the delivery vehicle that indicate the speed, orientation, and other movements of the device at different points along paths at the location.

In another example, the device may provide global positioning system (GPS) measurements (e.g., GPS waypoints) to the computing system along with the video data. In particular, the device may determining a mapping between the device's GPS waypoints with the corresponding portions (e.g., frames) of the video data such that the GPS waypoints may enhance the development and use of a navigation path at the location. For instance, the computing system may cause the delivery vehicle to follow the navigation path that extends between different GPS waypoints provided by the device.

In a further example, the computing system may receive GPS and accelerometer data along with video data from the transmitting device and determine a mapping between the GPS and accelerometer data and corresponding portions of received video data. The computing system may align the data with corresponding portions for subsequent use during the navigation path development and execution stages as previously indicated above with regards to other examples.

At block 604, method 600 may include identifying, using the video data, a set of permissible surfaces at the location. In some implementations, each identified permissible surface may correspond to a surface that was traversed by the demonstration path.

After receiving video data and possibly other information from a user's device, the computing system may process the incoming video data to identify surfaces that the recipient traversed during video capture. In particular, the computing system may use computer vision to gain high-level understanding from the video data, including detecting surfaces at the location that the recipient traversed while capturing video data showing the demonstration path. The computing system may be configured to understand that the path traveled by the recipient and shown in the video data represents the recipient's ideal path that a deliverer (e.g., delivery person, delivery vehicle) should use to complete deliveries at the location. The computing system may also be configured to detect the surfaces of the paths, such as sidewalks, walkways, streets, etc., traveled by the recipient and shown in the video data. Surface detection may be done using an image segmentation process to identify boundaries between surfaces in the environment. This way, the computing system can expand the specific path directly traversed by the recipient to include other portions of the same surfaces (e.g., a larger width or entire width of the sidewalk, walkway, street) and identify the expanded portions as permissible surfaces that the delivery vehicle may also use.

In some examples, the computing system may be configured to expand the demonstration path to include more of the permissible surfaces that extend from the directly traveled route of the recipient because the delivery vehicle and/or the object being delivered may require the additional space. For instance, a delivery vehicle may be much larger than the recipient and thus, the computing system may need to identify the permissible surfaces associated with the demonstration path rather than just the narrow path traveled by the recipient.

In some implementations, the computing system may use image-processing software to analyze video data, including for identifying surfaces that the recipient travels upon while capturing video data of the demonstration path. For instance, the computing system may use one or more processes to identify portions of the permissible paths that the recipient traversed during video capture of the demonstration path. In a further example, the computing system may also identify physical features for each permissible surface of the set of permissible features. For instance, the computing system may detect boundaries, slopes, texture, and other features of the identified permissible surfaces. In some instances, the computing system may segment the environment into continuous uniform surfaces separated by boundaries. For example, the computing system may divide areas into permissible surfaces and off-limit sections. This way, the computing system may identify the boundaries of permissible surfaces based on the borders of the surfaces with off-limit areas.

As an example, the computing system may determine where a sidewalk extends to until reaching grass. In another example, the computing system may determine that a portion of the demonstration path includes a gravel path that may cause problems for vehicles.

At block 606, method 600 may include determining a navigation path for a vehicle to follow at the location. After processing the video data and other information received from the device, the computing system may determine a navigation path that a vehicle may follow to complete a delivery or a different task at the location. In particular, the computing system may use its understanding of the received data, including the identified set of permissible surfaces, to determine a navigation path that is suitable for a delivery vehicle, but also resembles the demonstration path shown in the video data.

As indicated above, the navigation path may approximately follow the demonstration path traversed by the recipient capturing the video data, but may also include one or more variations that make the navigation path more suitable for navigation by a delivery vehicle. Although the navigation path may include some differences from the demonstration path, the computing system may be configured to determine the navigation path such that the navigation path still shares permissible surfaces identified by the computing system using the video data. A permissible surface may correspond to a surface of the demonstration path traversed by the videographer. For instance, example permissible surfaces may correspond to walkways, roads, driveways, and designated trails or paths, among other possible surfaces. These surfaces may correspond to the paths that people and vehicles may travel upon at the location rather than other off-limit surfaces that may include yards, gardens, and other non-permissible areas. As such, the computing system may determine the navigation path with some variations from the demonstration path that cause the delivery vehicle to stay within one or more permissible surfaces from the set of permissible surfaces.

Within examples, the variations may be included for numerous reasons. For instance, in some situations, the computing system may determine one or more variations that cause the navigation path to differ from the demonstration path due to the capabilities of the delivery vehicle completing the delivery. The delivery vehicle may require a wider path to travel upon and as a result, the computing system may determine the navigation path with one or more variations that enable the delivery vehicle to complete the delivery while keeping the delivery vehicle on permissible surfaces (e.g., walkways, sidewalks, roads) previously identified using video and other data from the device. Similarly, the size of the object or objects being delivered may also impact the navigation path determined by the computing system. The computing system may determine that a delivery vehicle requires more space in some portions of the delivery than the demonstration path provides. Consequently, the computing system may develop the navigation path such that the navigation path includes variations where needed to accommodate the size of the delivery while still having the navigation path use permissible surfaces previously identified. Other situations may cause the computing system to include variations in the navigation path compared to the demonstration path.

In some examples, the computing system may also determine the navigation path based on physical features identified during video data analysis. For instance, the computing system may factor the physical features, such as the boundaries, width, slope, and make up of permissible surfaces when developing the navigation path for the vehicle to follow.

At block 608, method 600 may include causing the vehicle to follow the navigation path to navigate the location. After determining the navigation path, the computing system may provide instructions to the vehicle to follow the navigation path to complete a delivery or perform some other task at the location. For instance, if the computing system corresponds to the control system of the delivery vehicle, the computing system may execute a control strategy to navigate the navigation path and complete the delivery. The computing system may avoid obstacles using sensor data acquired by sensors of the vehicle while keeping the vehicle on the permissible paths of the navigation path.

In another example, the computing system may correspond to a system configured to dispatch delivery vehicles, such as system 500 discussed above. In such a case, the computing system may select a particular vehicle to complete the delivery and provide instructions to that particular delivery vehicle to follow the navigation path when completing the delivery. The system's vehicle selection may depend on one or more factors, such as the availability of vehicles, the different capabilities of each vehicle, and the present and future locations of the vehicles. As discussed above with regards to FIG. 5, the system may organize the delivery of multiple deliveries using multiple vehicles in a manner the efficiently completes all of the deliveries. As such, the system may include one or more computing systems configured to receive video data showing demonstration paths at delivery locations and, as a result, develop navigation paths for the various locations using method 600 or similar processes. The system may further organize vehicles to complete the deliveries at the different locations using the determined navigation paths.

In an example implementation, the computing system may cause the delivery vehicle to follow GPS coordinates provided by the recipient's device in addition to navigating the determined navigation path. In another example implementation, the computing system may cause the delivery vehicle to measure its orientation, acceleration, and relative position using an IMU positioned on the delivery vehicle in order to compare the measurements to the measurements provided by the device along with the video data.

In a further implementation, the computing system performing method 600 may further estimate an amount of time that the delivery vehicle may require to navigate the determined navigation path at the location. For instance, the system configured to organize and dispatch multiple vehicles may use estimated delivery times when organizing the vehicles. The computing system may estimate the time based on factors, such as the type of delivery vehicle selected to perform the delivery, the conditions at the location (e.g., weather conditions), the duration the recipient took to traverse the demonstration path while capturing the video data, the distance and/or complexity of the determined navigation path, among other possible factors. In some cases, the computing system may use a weighted combination of the factors that can vary within examples.

In another example, the computing system may identify an obstacle positioned proximate to the demonstration as a result of analyzing the video data. In some instances, the computing system may determine the navigation path such that the navigation path includes a variation that avoids the obstacle, but still enables the delivery to stay within permissible surfaces from the set of permissible surfaces identified using the video data. In other cases, the computing system may determine that an identified obstacle prevents the delivery vehicle from following the navigation path to complete the delivery at the location. As a result, the computing system may send a request to a recipient at the location (e.g., the videographer) to extend the set of permissible surfaces in order to circumnavigate the obstacle to complete the delivery at the location. For example, the computing system may request for the vehicle to allow the delivery vehicle to navigate into the yard or another off-limit surface temporarily to avoid the obstacle before returning back to the navigation path. In a further example, the computing system may provide an interface that allows the recipient to select a path that the delivery vehicle would follow to avoid the obstacle. The interface may even enable the recipient to designate the rest of the path to complete the delivery.

In another example implementation, the computing system may enable a recipient to provide additional information, such as annotations that identify permissible surfaces or off-limit areas. For example, the computing system may provide an interface that enables the recipient to further assist the development of the navigation path. In some instances, the computing system may provide a request for annotations or supplemental information from the recipient after receiving video data of a demonstration path. The computing system may analyze video data or the demonstration path and determine that additional information, such as annotations from the recipient may help in the development of the navigation path.

FIG. 7A, FIG. 7B, FIG. 7C, FIG. 7D, and FIG. 7E illustrate example scenario 700 involving a computing system performing processes and operations relating to navigation path determination. In particular, scenario 700 involves a computing system determining the navigation path for completing a delivery at house 702 located in residential area.

Other example scenarios may involve a computing system determining navigation paths in other environments, such as commercial, outdoor, or industrial settings. For instance, a computing system may determine a navigation path for a delivery vehicle to follow in a completely indoor setting, such as an office, store, or shopping mall. Likewise, the computing system may also determine a route for a delivery vehicle to follow at an outdoor park. Further, although scenario 700 involves a delivery vehicle delivering to house 702, other examples scenarios may involve a vehicle or vehicles performing other tasks, such as locating and picking up objects or people for transportation.

Figure 7A:
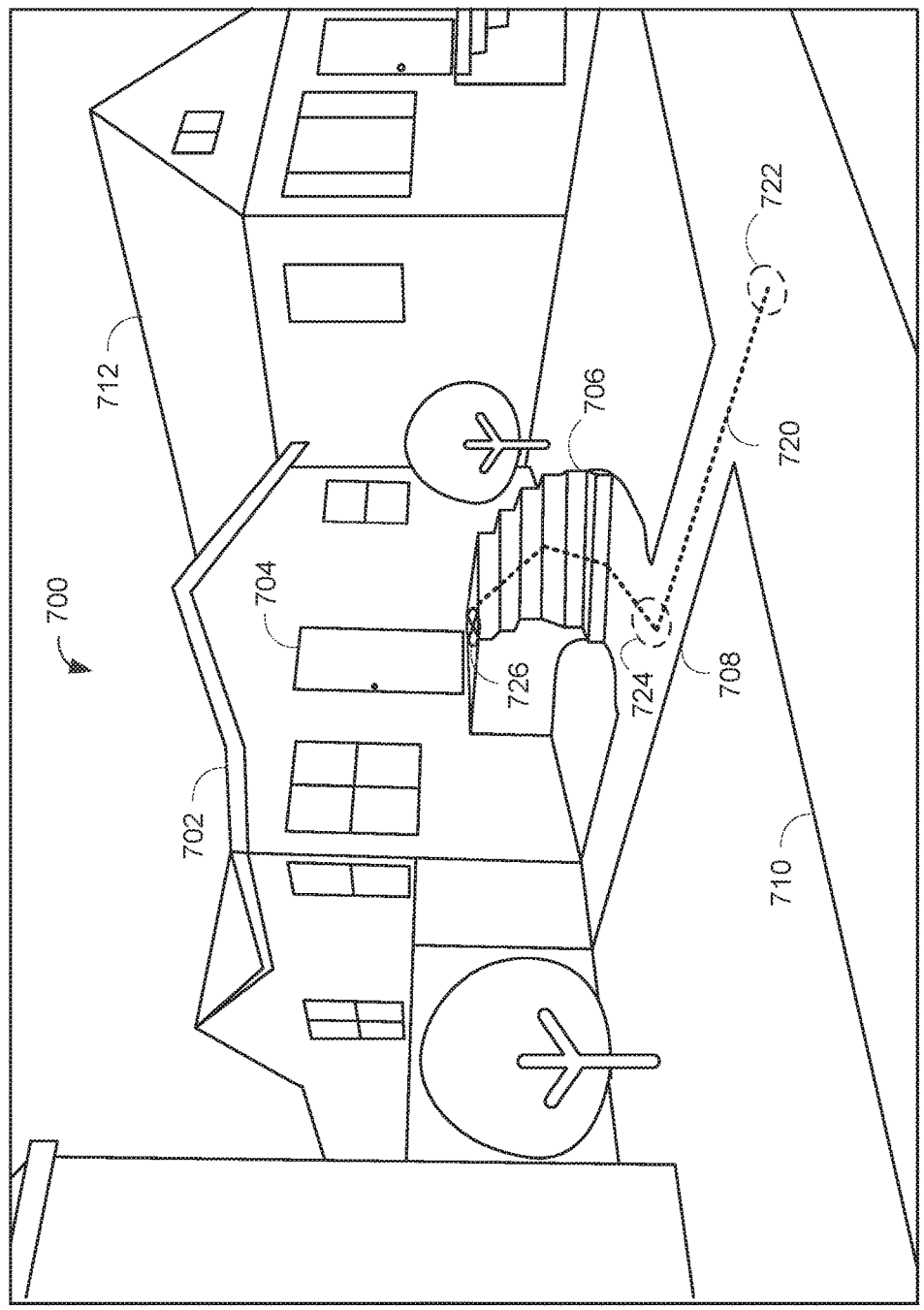
FIG. 7A illustrates an example demonstration path at a location.

FIG. 7A illustrates example demonstration path 720 at the location. As discussed above, prior to a computing system developing a navigation path for a vehicle to follow to complete a delivery at a location, the computing system may be required to obtain information about the location. In particular, in some instances, the computing system may acquire information directly from the target recipient, such as an indication of the drop off spot for completing the delivery or a demonstration path that shows the path that a deliverer (e.g., delivery person, delivery vehicle) should follow to complete the delivery.

As shown in FIG. 7A, the computing system may be required to obtain information about house 702, including where to drop off packages (e.g., by door 704). In order to convey this information to the computing system, the recipient may capture video data of demonstration path 720 at the location using a device (e.g., smartphone, camera) and send the captured video to the computing system. For example, the recipient may initially start capturing video data of demonstration path 720 starting at a general position (e.g., position 722) and continue to capture video data showing demonstration path 720 until reaching a target drop off location for the delivery (e.g., position 726 by door 704). This way, the recipient may convey how she wants the deliverer to traverse the location to the computing system, including an indication of the general path (e.g., demonstration path 72) for a delivery vehicle to follow. As previously discussed above, in some examples, the recipient's device may also send other information that may assist the computing system develop a navigation path for a delivery vehicle, such as GPS waypoints and measurements of the device's movements.

Consequently, the computing system may use the video data and other information provided via the recipient's device to obtain an understanding of demonstration path 720. More specifically the computing system may determine whether a delivery vehicle is fully capable of performing demonstration path 720 to its entirety or if the computing system may need to develop a navigation path for the delivery vehicle that includes some variations from demonstration path 720. For instance, the computing system may analyze demonstration path 720, including changes in direction, such as the turn at position 724. As a result of receiving the video data and possibly other information from the recipient's device, the computing system may further determine that demonstration path 720 extends from road 710 to walkway 708 until turning at position 724 in order to traverse stairs 706 until reaching the drop off location at position 726 by door 704.

In some cases, the computing system may determine that the delivery vehicle or object requires the system to develop a navigation path that follows the permissible surfaces and suggestions set forth via demonstration path 720, but also enables completion of the delivery. For instance, the computing system may determine that a delivery vehicle is incapable of traversing stairs 706 and determine that variations from demonstration path 720 are necessary to enable a delivery vehicle to complete a delivery to a drop off position by door 704.

Figure 7B:
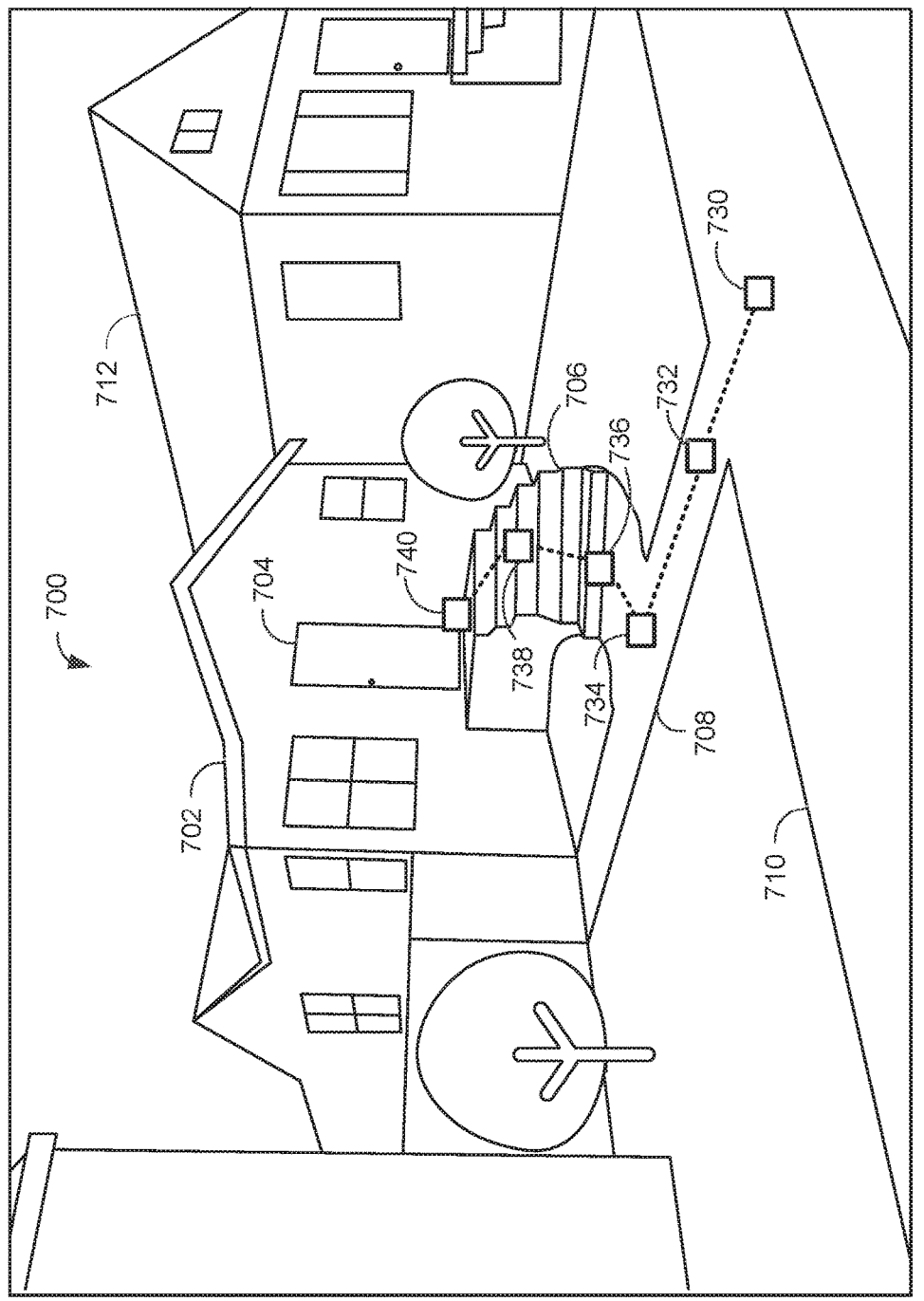
FIG. 7B illustrates example GPS waypoints that a computing system may use to develop a navigation path based on the demonstration path shown in FIG. 7A.

FIG. 7B shows example GPS waypoints that a computing system may use to further develop a navigation path based on demonstration path 720 shown in FIG. 7A. As indicated above, a device of a recipient at the location may send video data showing a demonstration path for a computing system to process to develop a navigation path for a delivery vehicle to follow to complete a delivery or deliveries at the location. In some instances, the device may also provide additional information to the computing system, such as GPS waypoints and IMU measurements. Particularly, as shown in FIG. 7B, the computing system may receive GPS waypoints (GPS waypoint 730, GPS waypoint 732, GPS waypoint 734, GPS waypoint 736, GPS waypoint 738, and GPS waypoint 740) in addition to the video data. Each GPS waypoint indicates a particular location (e.g., longitude, latitude coordinates) along demonstration path 720 and may serve as checkpoints that the computing system can use to ensure that a delivery vehicle is on the right path. In some instances, the computing system may use GPS waypoints 730-740 to identify permissible surfaces and to assist in developing the navigation path suitable for vehicles to use at the location.

In some cases, GPS waypoints 730-740 may arrive at the computing system aligned with the corresponding portions of video data. If this is the case, the computing system may utilize GPS waypoints 730-740 and corresponding video data without having to perform an alignment process. In other cases, however, the computing system may be required to determine a mapping between GPS waypoints 730-740 and the corresponding portions of video data in order to develop the navigation path using both the video data and GPS waypoints 730-740.

Figure 7C:
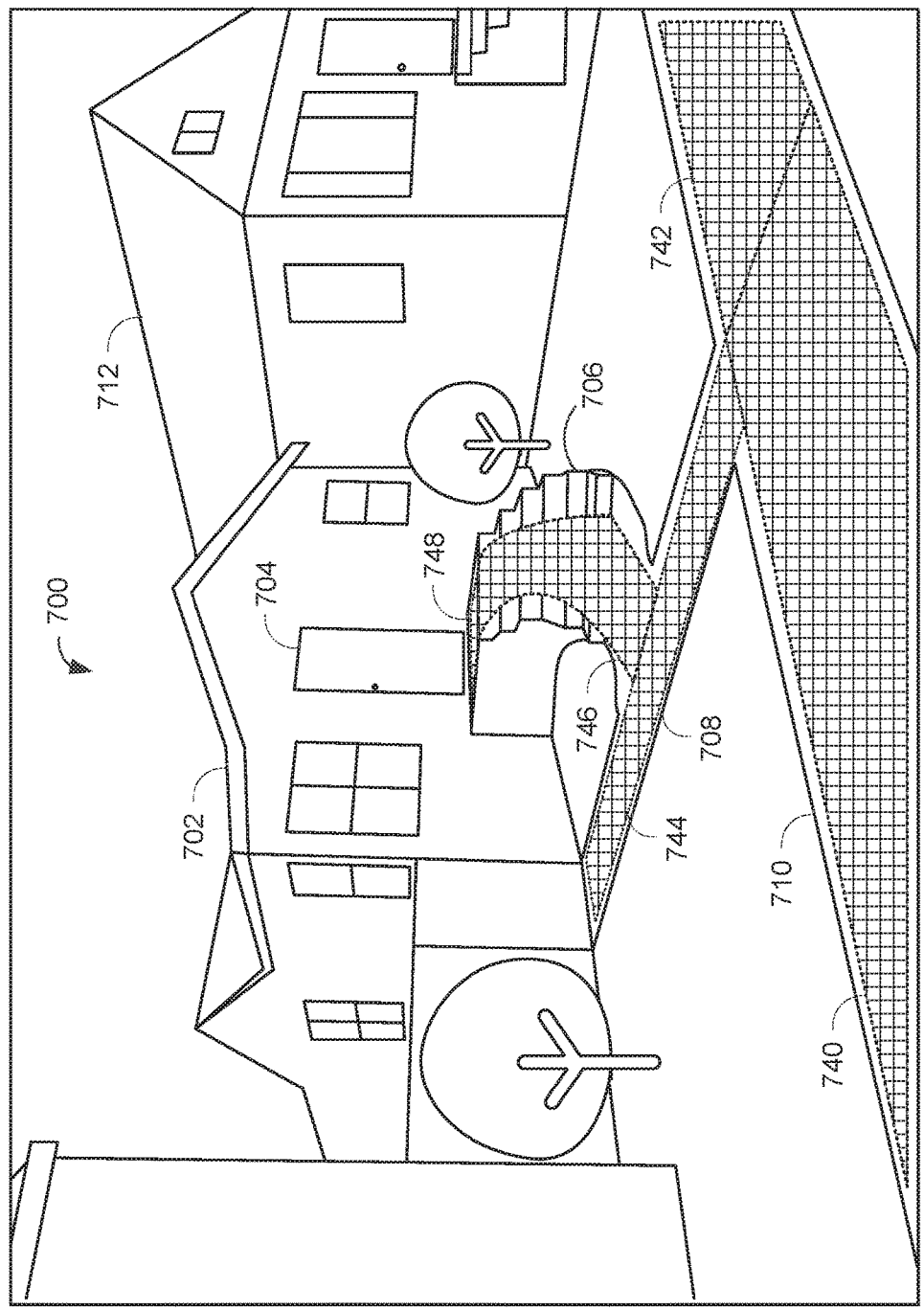
FIG. 7C illustrates a computing system identifying a set of permissible surfaces that correspond to the demonstration path shown in FIG. 7A and FIG. 7B.

FIG. 7C illustrates a computing system identifying a set of permissible surfaces that corresponds to demonstration path 720 shown in FIG. 7A and FIG. 7B. As previously described herein, the computing system may use received video data to determine permissible surfaces suitable for the delivery vehicle to navigate, and as a result, use the permissible surfaces to develop the navigation path. As shown in FIG. 7C, the permissible surfaces may correspond to the surfaces associated with the path traversed by the recipient capturing demonstration path 720. In particular, the computing system may identify that surface 740 and surface 742 corresponding to road 710, surface 744 corresponding to walkway 708, surface 746 corresponding to stairs 706, and surface 748 positioned by door 704 are all permissible surfaces that a delivery vehicle may travel upon since all the surfaces were traversed in demonstration path 720. The computing system may identify the above permissible surfaces (e.g., surfaces 740-748) by extracting information from the video data, including detection and analysis of demonstration path 720.

As further shown in FIG. 7C, the computing system may also use computer vision analysis to identify extensions of the permissible surfaces that extend beyond just the particular path traversed in demonstration path 720. In particular, surface 740 and surface 742 are shown extending to cover portions of road 710 that were not directly touched by the recipient capturing demonstration path 720. Rather, the computing system may be configured to determine that road 710 as an entirety is suitable for a delivery vehicle to use despite only a portion was included in demonstration path 720. Similarly, surface 744 is shown extending beyond position 724 where demonstration path 720 involves a turn to stairs 706 since the computing system may recognize that the extension of surface 744 covers permissible surface walkway 708. In another example, the computing system may be configured to constrain permissible surfaces to portions of the surfaces located within a threshold distance (e.g., 1-5 meters) from demonstration path 720.

Figure 7D:
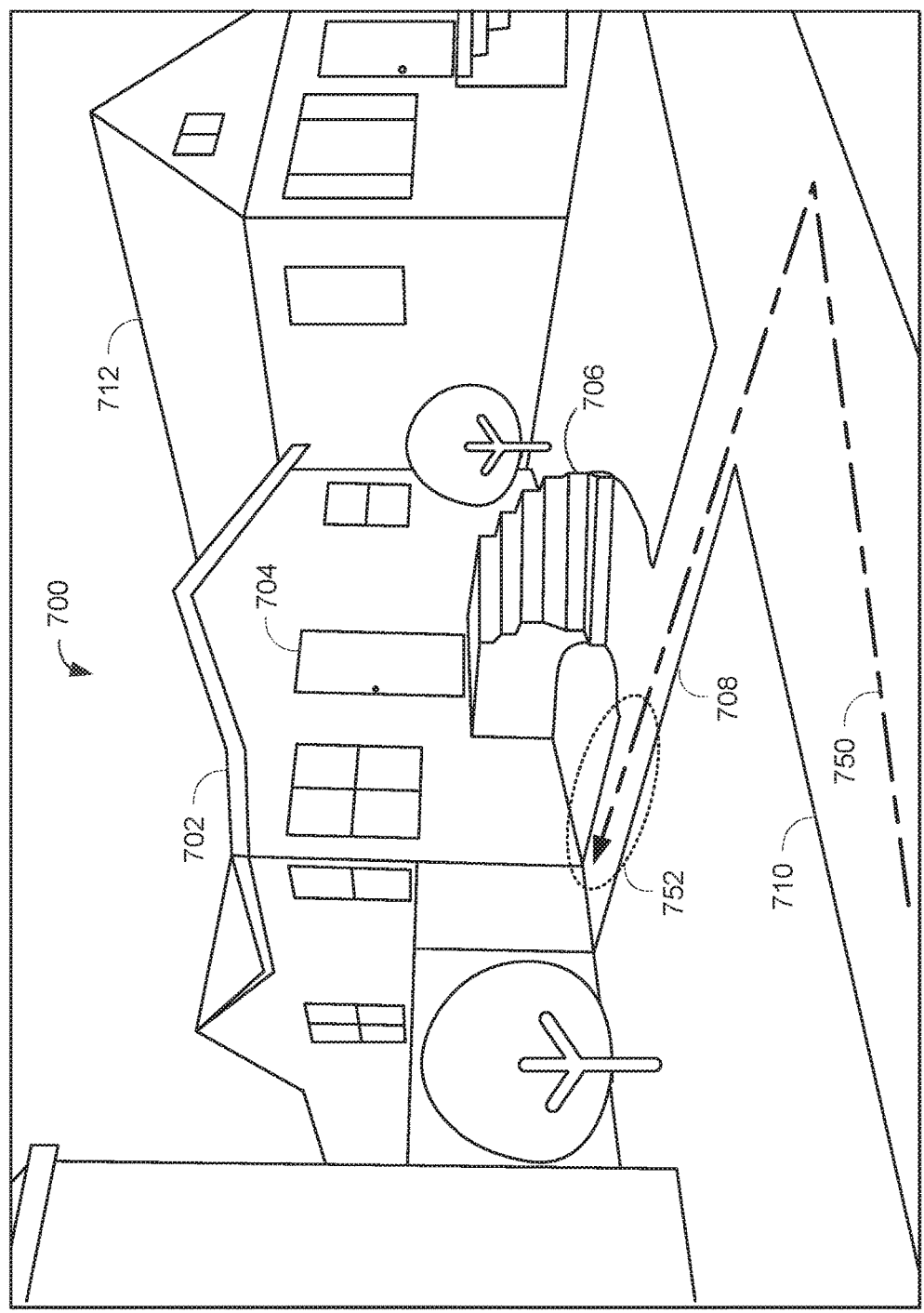
FIG. 7D illustrates an example navigation path that a vehicle may follow.

FIG. 7D illustrates example navigation path 750 that a delivery vehicle may follow. After identifying permissible surfaces and analyzing demonstration path 720, the computing system may determine navigation path 750 for a vehicle to use to complete the delivery. As shown, navigation path 750 may enable a vehicle to navigate the location while remaining on identified permissible surfaces (e.g., road 710, walkway 708, stairs 706). Depending on the capabilities of the delivery vehicle, the delivery vehicle may deliver the package or materials to a drop off location nearby door 704.

In some examples, the computing system may determine a navigation path that includes one or more variations from the demonstration path provided by the recipient in the video data. As shown in FIG. 7D, navigation path 750 determined by the computing system includes at least one variation (e.g., variation 752) from demonstration path 720 showing that a delivery vehicle may navigate further along walkway 710 since the delivery vehicle may not have the ability to climb stairs 706. Variation 752 may keep the delivery vehicle on permissible surface 744 (i.e., walkway 708) and also positions the delivery vehicle closer to the drop off location by door 704. As a result, a delivery vehicle configured with a manipulator (e.g., mechanical arm) may lift and position the package by door 704.

FIG. 7E illustrates an example request for navigation path modification to overcome an obstacle associated with navigation path 750 shown in FIG. 7D. As indicated above, navigation path 750 may include one or more variations from demonstration path 720, such as variation 752. In a situation where the delivery vehicle cannot traverse stairs 706, the computing system may send a request to enable the delivery vehicle to temporarily travel upon area 760 to complete the delivery using a mechanical gripper to lift the package and drop it off by door 704. The computing system may query the device that provided the original video data in order to expand the set of permissible surfaces that the delivery vehicle may travel upon to complete the delivery.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
receiving, at a computing system, video data showing a demonstration path for navigating a location;
identifying, using the video data, a set of permissible surfaces at the location, wherein each permissible surface was traversed by the demonstration path;
determining a navigation path for a vehicle to follow at the location, wherein the navigation path includes a variation from the demonstration path such that the variation causes the vehicle to stay within one or more permissible surfaces from the set of permissible surfaces; and
causing, by the computing system, the vehicle to follow the navigation path to navigate the location.

2. The method of claim 1, wherein the demonstration path ends with a delivery destination, wherein the navigation path is determined to reach the delivery destination, wherein the method further comprises causing the vehicle to deliver an object to the delivery destination.

3. The method of claim 1, wherein receiving video data showing the demonstration path comprises:
receiving global positioning system (GPS) waypoints positioned at a plurality of points of the demonstration path; and
determining a mapping between the GPS waypoints and corresponding portions of video data.

4. The method of claim 3, wherein determining the navigation path for the vehicle to follow at the location is based on the mapping between the GPS waypoints and the corresponding portions of video data.

5. The method of claim 1, wherein receiving video data showing the demonstration path comprises:
receiving global positioning system (GPS) and accelerometer data that corresponds to the video data showing the demonstration path;
determining a mapping between the GPS and accelerometer data and corresponding portions of video data; and
wherein determining the navigation path for the vehicle to follow at the location is based on the mapping between the GPS and accelerometer data and the corresponding portions of video data.

6. The method of claim 1, further comprising:
based on the navigation path, selecting the vehicle from a group of vehicles to navigate the location, wherein the group of vehicles includes at least a first type of vehicle having a first set of capabilities and a second type of vehicle having a second set of capabilities, and wherein selecting the vehicle from the group of vehicles is based on capabilities of the selected vehicle.

7. The method of claim 1, further comprising:
based on determining the navigation path for the vehicle to follow at the location, estimating an amount of time that the vehicle will require to navigate the navigation path.

8. The method of claim 1, further comprising:
identifying, using the video data, an obstacle positioned proximate the demonstration path; and
wherein determining the navigation path for the vehicle to follow at the location comprises:
determining the navigation path such that the navigation path includes a given variation that avoids the obstacle but causes the vehicle to stay within one or more permissible surfaces from the set of permissible surfaces.

9. The method of claim 1, wherein determining navigation path for the vehicle to follow at the location comprises:
determining the navigation path to include the variation from the demonstration path based on locomotive capabilities of the vehicle.

10. The method of claim 1, wherein determining the navigation path for the vehicle to follow at the location comprises:
determining the navigation path to include the variation from the demonstration path based on one or more parameters of an object to be delivered at the location.

11. A system comprising:
a vehicle; and
a control system configured to:
receive video data showing a demonstration path for navigating a location;
identify, using the video data, a set of permissible surfaces at the location, wherein each permissible surface was traversed by the demonstration path;
determine a navigation path for the vehicle to follow at the location, wherein the navigation path includes a variation from the demonstration path such that the variation causes the vehicle to stay within one or more permissible surfaces from the set of permissible surfaces; and
cause the vehicle to follow the navigation path to navigate the location.

12. The system of claim 11, wherein the control system is further configured to:
determine a position proximate to the location to drop off the vehicle, wherein the vehicle is positioned on another vehicle configured to navigate between locations; and
cause the drop off of the vehicle at the position.

13. The system of claim 11, wherein the control system is configured to identify the set of permissible surfaces at the location further by determining physical features for each permissible surface of the set of permissible surfaces.

14. The system of claim 13, wherein the control system is configured to determine the navigation path for the vehicle to follow at the location based on the physical features determined for each permissible surface of the set of permissible surfaces.

15. The system of claim 11, wherein the control system is further configured to provide, based on the received video data, a request for annotations that indicate waypoints that correspond to the demonstration path.

16. The system of claim 15, wherein the control system is configured to determine portions of the navigation path based on the waypoints.

17. A non-transitory computer readable medium having stored therein program instructions executable by a computing system to cause the computing system to perform operations, the operations comprising:

receiving video data showing a demonstration path for navigating a location;

identifying, using the video data, a set of permissible surfaces at the location, wherein each permissible surface was traversed by the demonstration path;

determining a navigation path for a vehicle to follow at the location, wherein the navigation path includes a variation from the demonstration path such that the variation causes the vehicle to stay within one or more permissible surfaces from the set of permissible surfaces; and causing the vehicle to follow the navigation path to navigate the location.

18. The non-transitory computer readable medium of claim 17, wherein the operation of identifying the set of permissible surfaces at the location comprises:

identifying a paved walkway that corresponds to a given permissible surface at the location.

19. The non-transitory computer readable medium of claim 18, wherein the operation of determining the navigation path for the vehicle to follow at the location comprises:

determining the navigation path such that a portion of the navigation path uses a portion of the identified paved walkway.

20. The non-transitory computer readable medium of claim 17, wherein the operations further comprise:

identifying, using the video data, an obstacle positioned proximate the demonstration path;

determining that the obstacle prevents the vehicle from following the navigation path at the location; and sending a request to a user at the location to expand the set of permissible surfaces to circumnavigate the obstacle to complete navigation at the location.

\* \* \* \* \*